(12) United States Patent
Karjala et al.

(10) Patent No.: US 11,542,368 B2
(45) Date of Patent: *Jan. 3, 2023

(54) ETHYLENE/CO INTERPOLYMERS AND PROCESSES TO MAKE THE SAME

(71) Applicant: Dow Global Technologies LLC, Midland, MI (US)

(72) Inventors: Teresa P. Karjala, Lake Jackson, TX (US); José Ortega, Lake Jackson, TX (US); Lori L. Kardos, Sugar Land, TX (US); James L. Cooper, Brazoria, TX (US)

(73) Assignee: Dow Global Technologies LLC, Midland, MI (US)

( * ) Notice: Subject to any disclaimer, the term of this patent is extended or adjusted under 35 U.S.C. 154(b) by 258 days.

This patent is subject to a terminal disclaimer.

(21) Appl. No.: 16/758,096

(22) PCT Filed: Oct. 31, 2018

(86) PCT No.: PCT/US2018/058445
§ 371 (c)(1),
(2) Date: Apr. 22, 2020

(87) PCT Pub. No.: WO2019/089750
PCT Pub. Date: May 9, 2019

(65) Prior Publication Data
US 2020/0325275 A1    Oct. 15, 2020

Related U.S. Application Data

(60) Provisional application No. 62/579,571, filed on Oct. 31, 2017.

(51) Int. Cl.
*C08F 210/02* (2006.01)
*C08L 23/08* (2006.01)
(Continued)

(52) U.S. Cl.
CPC ............. *C08G 67/02* (2013.01); *C08F 2/34* (2013.01); *C08F 210/02* (2013.01); *C08L 23/06* (2013.01);
(Continued)

(58) Field of Classification Search
None
See application file for complete search history.

(56) References Cited

U.S. PATENT DOCUMENTS 3,676,401 A    7/1972  Henry
3,860,538 A    1/1975  Guillet et al.
(Continued)

FOREIGN PATENT DOCUMENTS

EP    230143 B1    11/1989
GB    1448062 A    9/1976
(Continued)

OTHER PUBLICATIONS

Mourey et al., "A Strategy for Interpreting Multidetector Size-Exclusion Chromatography Data I", Chromatography Polym., 1992, Chapter 12, pp. 180-198.
(Continued)

*Primary Examiner* — Richard A Huhn
(74) *Attorney, Agent, or Firm* — Dinsmore & Shohl LLP

(57) ABSTRACT

A composition comprising an ethylene/CO interpolymer, formed from a high pressure, free-radical polymerization, and wherein the ethylene/CO interpolymer has the following properties: a) a CO content from "greater than 0" weight percent to less than, or equal to, 10 weight percent CO (carbon monoxide), based on the weight of the interpolymer; and b) a melting point, Tm, in ° C. that meets the following relationship: $Tm\ (°\ C.) \leq 601.4 \times (\text{Density in g/cc}) - 452.5(°\ C.)$.

18 Claims, 2 Drawing Sheets

(51) Int. Cl.
  *C08L 73/00* (2006.01)
  *C08G 67/02* (2006.01)
  *C08F 2/34* (2006.01)
  *C08L 23/06* (2006.01)
  *B29C 48/00* (2019.01)
  *B01J 19/18* (2006.01)

(52) U.S. Cl.
  CPC ....... *C08L 23/0815* (2013.01); *B01J 19/1812* (2013.01); *B01J 2219/00159* (2013.01); *B29C 48/022* (2019.02); *C08L 23/08* (2013.01); *C08L 73/00* (2013.01); *C08L 2203/16* (2013.01); *C08L 2205/02* (2013.01); *C08L 2207/066* (2013.01)

(56) References Cited

U.S. PATENT DOCUMENTS

| | | | |
|---|---|---|---|
| 4,714,741 | A | 12/1987 | Balduff et al. |
| 4,962,164 | A | 10/1990 | Jabarin et al. |
| 5,178,960 | A | 1/1993 | Cook |
| 5,844,045 | A | 12/1998 | Kolthammer et al. |
| 5,869,575 | A | 2/1999 | Kolthammer et al. |
| 6,407,191 | B1 | 6/2002 | Mezquita et al. |
| 6,448,341 | B1 | 9/2002 | Kolthammer et al. |
| 6,538,070 | B1 | 3/2003 | Cardwell et al. |
| 6,545,088 | B1 | 4/2003 | Kolthammer et al. |
| 6,558,809 | B1 | 5/2003 | Kelch et al. |
| 6,566,446 | B1 | 5/2003 | Parikh et al. |
| 9,523,015 | B2 | 12/2016 | Karjala et al. |
| 10,815,375 | B2 * | 10/2020 | Karjala .................. B32B 27/32 |
| 2008/0242809 | A1 | 10/2008 | Neuteboom et al. |
| 2014/0094533 | A1 | 4/2014 | Karjala et al. |
| 2015/0299493 | A1 * | 10/2015 | Karjala .................. B32B 27/08 524/585 |
| 2017/0107315 | A1 * | 4/2017 | Osby .................. C09D 123/0869 |
| 2017/0114163 | A1 * | 4/2017 | Berbee ................ C08F 222/102 |
| 2019/0136050 | A1 * | 5/2019 | Karjala .................. C08G 67/02 |

FOREIGN PATENT DOCUMENTS

| | | | |
|---|---|---|---|
| JP | 2016508175 | A | 3/2016 |
| JP | 2017519877 | A | 7/2017 |
| JP | 2017523273 | A | 8/2017 |
| WO | 9118944 | A1 | 12/1991 |
| WO | 9745465 | A1 | 12/1997 |
| WO | 2007110127 | A1 | 10/2007 |
| WO | 2011071843 | A1 | 6/2011 |
| WO | 2012057975 | A1 | 5/2012 |
| WO | 2012084787 | A1 | 6/2012 |
| WO | 2014105608 | A1 | 7/2014 |
| WO | 2017189299 | A1 | 11/2017 |

OTHER PUBLICATIONS

Balke et al., "A Strategy for Interpreting Multidetector Size-Exclusion Chromatography Data II", Chromatography Polym., 1992, Chapter 13, pp. 199-219.

International Search Report and Written Opinion pertaining to PCT/US2018/058445, dated Mar. 2, 2019.

Kratochvil, P., "Fundamental Light-Scattering Methods", Chapter 3, 1987, Elsevier, Oxford, NY, pp. 113-144.

Scott et al., "Degradable Polymers, Principles and Applications", Chapter 8: Ethylene-carbon monoxide copolymers, 1995, pp. 156-168, Chapman and Hall.

Ward et al., "Ethylene-Carbon Monoxide Extrudable Adhesive Copolymers for Polyvinylidene Chloride", Extrudable Adhesives, Tappi Journal, Jun. 1988, pp. 140-144.

Williams et al., "The Construction of a Polyethylene Calibration Curve for Gel Permeation Chromatography Using Polystyrene Fractions", J. Polym. Sci., Polym. Letters, 1968, 6, pp. 621-624.

Zimm, B.H., "Apparatus and Methods for Measurement and Interpretation of the Angular Variation of Light Scattering Preliminary Results on Polystyrene Solutions", J Chem. Phys., 1948,16, 1099-1116.

European Examination Report dated May 19, 2022, pertaining to EP Patent Application No. 18815375.3, 3 pgs.

Notice of Reasons for Refusal dated Oct. 25, 2022, pertaining to JP Patent Application No. 2020-544344, 6 pgs.

Search Report dated Oct. 19, 2022, pertaining JP Patent Application No. 2020-544344, 16 pgs.

* cited by examiner

ETHYLENE/CO INTERPOLYMERS AND PROCESSES TO MAKE THE SAME

CROSS-REFERENCE TO RELATED APPLICATIONS

This application is a National Stage Entry under 35 U.S.C. § 371 of International Patent Application No. PCT/US2018/058445, filed Oct. 31, 2018, which claims priority to U.S. Provisional Patent Application Ser. No. 62/579,571, filed Oct. 31, 2017, both of which are incorporated by reference herein in their entirety.

BACKGROUND OF THE INVENTION

Companies that extrusion coat a variety of polymers, including low density polyethylene (LDPE), onto paper and paperboard continually have problems obtaining good "fiber tear" adhesion, which is the amount of adhesion required to have adhesion between the polymer and the paper greater than the adhesion of the paper fibers to themselves. When the polymer is pulled from a paper substrate, if fiber tear occurs, this adhesion is considered acceptable. If the polymer is pulled from the paper without fibers (without fiber tear), this is considered unacceptable adhesion. Improved adhesion is also desired in the extrusion lamination process, which is used to manufacture multilayer substrates. Ethylene-based polymers used for coatings and films are disclosed in the following references: International Publication Nos. WO2014/105608, WO2011/071843, WO1991/18944, WO2007/110127, WO1997/45465, WO2012/057975, WO2012/084787; U.S. Pat. Nos. 9,523,015, 6,407,191, 5,178,960, 3,860,538, 4,714,741, 6,558,809, 4,962,164, 3,676,401; GB 1448062; EP 0230143B1; U.S. Publication Nos. 2017/0114163, 2017/0107315, 2008/0242809, and Ward et al., *Ethylene-Carbon Monoxide Extrudable Adhesive Copolymers for Polyvinylidene Chloride*, June 1988 Tappi Journal, pp. 140-144; Scott et al., *Degradable Polymers, Principles and Applications*, Chapter 8: Ethylene-carbon monoxide copolymers, pp. 156-168, Chapman and Hall (1995).

It is a well-known that, when running extrusion coating lines, at higher and higher line speeds, with conventional polymers, unacceptable fiber tear adhesion results. This adhesion is related to the oxidation of the molten polymer as it exits the extrusion die, and before it comes in contact with the paper (or the time in the air gap). At higher line speeds, the molten polymer curtain has less time to oxidize, which can reduce adhesion. There is a need for new ethylene-based polymers that can be used in high speed extrusion coating lines, and which have good melt strength and adhesion to paper substrates, and which can be used at lower melt temperatures, and/or at higher line speeds of the paper substrate. These needs have been met by the following invention.

SUMMARY OF THE INVENTION

A composition comprising an ethylene/CO interpolymer, formed from a high pressure, free-radical polymerization, and wherein the ethylene/CO (carbon monoxide) interpolymer has the following properties:

a) a CO content from "greater than 0" weight percent to less than, or equal to, 10 weight percent CO (carbon monoxide), based on the weight of the interpolymer; and b) a melting point, Tm, in ° C. that meets the following relationship:

$$Tm(° C.) \leq 601.4*(\text{Density in } g/cc) - 452.5(° C.).$$

DETAILED DESCRIPTION

Figure 1:
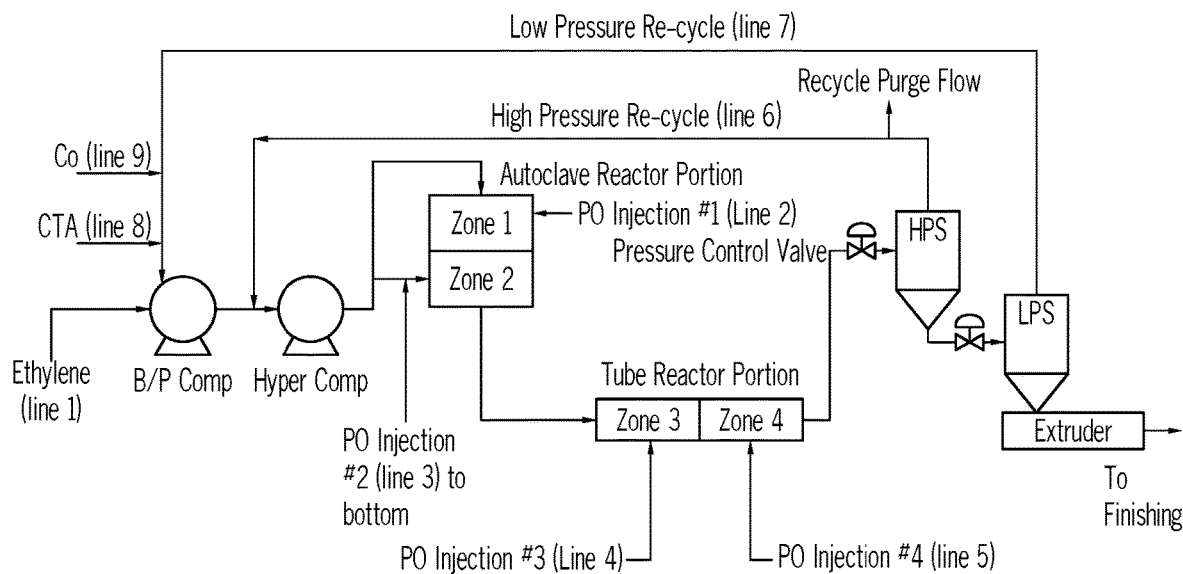
FIG. 1 depicts a reactor system used in the invention.

It has been discovered that the noted ethylene/CO interpolymers, and further copolymers, can be used to increase melt strength and improve low temperature adhesion to substrates. It has been discovered that ethylene/CO interpolymers and copolymers made with 2-3 wt % CO had substantially higher melt strength as compared to those made with 1 wt % or less CO. The higher CO levels also result in improved adhesion at lower temperatures, as compared to samples with lower CO levels.

A composition comprising an ethylene/CO interpolymer, formed from a high pressure, free-radical polymerization, and wherein the ethylene/CO interpolymer has the following properties:

a) a CO content from "greater than 0" weight percent to less than 10 weight percent CO (carbon monoxide), based on the weight of the interpolymer; and b) a melting point, Tm, in ° C. that meets the following relationship:

$$Tm(° C.) \leq 601.4(° C./(g/cc))*(\text{Density in } g/cc) - 452.5(° C.).$$

In a further embodiment, the ethylene/CO interpolymer is an ethylene/CO copolymer.

The composition may comprise a combination of two or more embodiments as described herein.

The ethylene/CO interpolymer, and further copolymer, may comprise a combination of two or more embodiments as described herein.

As used herein, the CO content refers to polymerized CO in the polymer.

In one embodiment, the ethylene/CO interpolymer has a) a CO content from 0.1 wt % to less than 10 wt %, or from 0.2 to less than 10 wt %, or from 0.5 wt % to less than 10 wt %, based on the weight of the interpolymer. In a further embodiment, the ethylene/CO interpolymer is an ethylene/CO copolymer.

In one embodiment, the ethylene/CO interpolymer has a) a CO content from 1.0 wt % to 9.0 wt %, or from 1.0 wt % to 9.0 wt % or from 1.2 to 8.0 wt %, or from 1.4 wt % to 7.0 wt %, or from 1.6 wt % to 6.0 wt %, or from 1.8 wt % to 5.0 wt %, based on the weight of the interpolymer. In a further embodiment, the ethylene/CO interpolymer is an ethylene/CO copolymer.

In one embodiment, the ethylene/CO interpolymer has a CO content $\geq 1.2$ wt %, or $\geq 1.4$ wt %, or $\geq 1.6$ wt %, or $\geq 1.8$ wt %, or $\geq 2.0$ wt %, or $\geq 2.2$ wt %, or $\geq 2.4$ wt %, based on the weight of the interpolymer. In a further embodiment, the ethylene/CO interpolymer is an ethylene/CO copolymer. In one embodiment, the ethylene/CO interpolymer has a CO content $\leq 4.0$ wt %, or $\leq 3.8$ wt %, or $\leq 3.6$ wt %, or $\leq 3.4$ wt %, or $\leq 3.2$ wt %, based on the weight of the interpolymer. In a further embodiment, the ethylene/CO interpolymer is an ethylene/CO copolymer.

In one embodiment, the ethylene/CO interpolymer meets the following relationship: MS (cN) ≥2.0×(wt % CO)+2.0. In a further embodiment, the ethylene/CO interpolymer is an ethylene/CO copolymer.

In one embodiment, the ethylene/CO interpolymer has a melt index ($I_2$) from 0.1 to 100 g/10 min, or from 0.5 to 50 g/10 min, or from 1.0 to 30 g/10 min. Additionally, the ethylene/CO interpolymer may have a melt index ($I_2$) from 0.1 to 6 g/10 min, or from 0.3 to 3 g/10 min, or from 0.3 to 0.7 g/10 min. In a further embodiment, the ethylene/CO interpolymer is an ethylene/CO copolymer.

In one embodiment, the ethylene/CO interpolymer has a melt index ($I_2$) ≥1.5 g/10 min, or ≥2.0 g/10 min, or ≥2.5 g/10 min, or ≥3.0 g/10 min, or ≥3.5 g/10 min. In a further embodiment, the ethylene/CO interpolymer is an ethylene/CO copolymer. In one embodiment, the ethylene/CO interpolymer has a melt index ($I_2$)≤20 g/10 min, or ≤15 g/10 min, or ≤10 g/10 min, or ≤8.0 g/10 min, or ≤7.0 g/10 min, or ≤6.0 g/10 min. In a further embodiment, the ethylene/CO interpolymer is an ethylene/CO copolymer.

In one embodiment, the ethylene/CO interpolymer has a Tm (° C.) ≥601.4(° C./(g/cc))*(Density in g/cc)–460.0(° C.). In a further embodiment, the ethylene/CO interpolymer is an ethylene/CO copolymer.

In one embodiment, the ethylene/CO interpolymer has a melting temperature ($T_m$) ≥102° C., or ≥103° C., or ≥104° C., or ≥105° C., or ≥106° C., as determined by DSC (peak temp.). In a further embodiment, the ethylene/CO interpolymer is an ethylene/CO copolymer. In one embodiment, the ethylene/CO interpolymer has a melting temperature ($T_m$) ≤114° C., or ≤113° C., or 112° C., or ≤111° C., or ≤110° C., or ≤109° C., as determined by DSC (peak temp.). In a further embodiment, the ethylene/CO interpolymer is an ethylene/CO copolymer.

In one embodiment, the ethylene-based polymer has a melting temperature, $T_m$, from 102° C. to 114° C., or from 103° C. to 113° C., or from 104° C. to 112° C., or from 105° C. to 111° C., or from 106° C. to 110° C., as determined by DSC (peak temp.). In a further embodiment, the ethylene/CO interpolymer is an ethylene/CO copolymer.

In one embodiment, the ethylene/CO interpolymer has a crystallization temperature ($T_a$) ≥91° C., or ≥92° C., or ≥93° C., or ≥94° C., as determined by DSC (peak temp.). In a further embodiment, the ethylene/CO interpolymer is an ethylene/CO copolymer. In one embodiment, the ethylene/CO interpolymer has a crystallization temperature ($T_a$)≤99° C., or ≤98° C., or ≤97° C., or ≤96° C., as determined by DSC (peak temp.). In a further embodiment, the ethylene/CO interpolymer is an ethylene/CO copolymer.

In one embodiment, the ethylene/CO interpolymer has a percent crystallinity ≥45, or ≥46, or ≥47, or ≥48, or ≥49, as determined by DSC (peak temp.). In a further embodiment, the ethylene/CO interpolymer is an ethylene/CO copolymer. In one embodiment, the ethylene/CO interpolymer has a percent crystallinity ≤55, or ≤54, or ≤53, or ≤52, or ≤51, as determined by DSC (peak temp.). In a further embodiment, the ethylene/CO interpolymer is an ethylene/CO copolymer.

In one embodiment, the ethylene/CO interpolymer has a density ≥0.940 g/cc, or ≥0.945 g/cc, or ≥0.950 g/cc, or ≥0.955 g/cc (1 cc=1 cm$^3$). In a further embodiment, the ethylene/CO interpolymer is an ethylene/CO copolymer. In one embodiment, the ethylene/CO interpolymer has a density ≤0.990 g/cc, or ≤0.985 g/cc, or ≤0.980 g/cc, or ≤0.975 g/cc, or ≤0.970 g/cc. In a further embodiment, the ethylene/CO interpolymer is an ethylene/CO copolymer.

In one embodiment, the ethylene/CO interpolymer has a density ≥0.910 g/cc, or ≥0.912 g/cc, or ≥0.915 g/cc, or ≥0.918 g/cc, or ≥0.920 g/cc, or ≥0.922 g/cc, or ≥0.925 g/cc, or ≥0.928 g/cc, or ≥0.930 g/cc, or ≥0.932 g/cc, or ≥0.935 g/cc (1 cc=1 cm$^3$). In a further embodiment, the ethylene/CO interpolymer is an ethylene/CO copolymer. In one embodiment, the ethylene/CO interpolymer has a density ≤0.950 g/cc, or ≤0.948 g/cc, or ≤0.945 g/cc, or ≤0.942 g/cc, or ≤0.941 g/cc. In a further embodiment, the ethylene/CO interpolymer is an ethylene/CO copolymer.

In one embodiment, the ethylene/CO interpolymer has a density from 0.910 to 0.950 g/cc (1 cc=1 cm$^3$), or from 0.920 to 0.950 g/cc, or from 0.925 to 0.950 g/cc, or from 0.930 to 0.945 g/cc, or from 0.935 to 0.942 g/cc. In a further embodiment, the ethylene/CO interpolymer is an ethylene/CO copolymer.

In one embodiment, the ethylene/CO interpolymer has a molecular weight distribution (cc-GPC Mw/Mn) ≥8.0, or ≥8.5, or ≥9.0, or ≥9.5, or ≥10.0. In a further embodiment, the ethylene/CO interpolymer is an ethylene/CO copolymer. In one embodiment, the ethylene/CO interpolymer has a molecular weight distribution (cc-GPC Mw/Mn)≤15.0, or ≤14.5, or ≤14.0, or ≤13.5, or ≤13.0, or ≤12.5, or ≤12.0. In a further embodiment, the ethylene/CO interpolymer is an ethylene/CO copolymer.

In one embodiment, the ethylene/CO interpolymer has a molecular weight distribution (cc-GPC Mw/Mn) from 8.0 to 14.0, further from 9.0 to 13.0, further from 10.0 to 12.0, as determined by conventional GPC. In a further embodiment, the ethylene/CO interpolymer is an ethylene/CO copolymer.

In an alternative embodiment, the ethylene/CO interpolymer has a molecular weight distribution (cc-GPC Mw/Mn) of from 3 to 12, or from 4 to 11, or from 4.5 to 11.

In one embodiment, the ethylene/CO interpolymer has a number average molecular weight (cc-GPC Mn) ≥10,000 g/mol, or ≥11,000 g/mol, or ≥12,000 g/mol, or ≥13,000 g/mol. In a further embodiment, the ethylene/CO interpolymer is an ethylene/CO copolymer. In one embodiment, the ethylene/CO interpolymer has a number average molecular weight (cc-GPC Mn)≤20,000 g/mol, or ≤19,000 g/mol, or ≤18,000 g/mol, or ≤17,000 g/mol, or ≤16,000 g/mol, or ≤15,000 g/mol. In a further embodiment, the ethylene/CO interpolymer is an ethylene/CO copolymer.

In one embodiment, the ethylene-based polymer has a number average molecular weight (Mn) from 10,000 g/mol to 25,000 g/mol, further from 10,000 g/mol to 20,000 g/mol, further from 11,000 g/mol to 19,000 g/mol, further from 11,000 g/mol to 16,000 g/mol, further from 12,000 g/mol to 15,000 g/mol, as determined by conventional GPC. In a further embodiment, the ethylene/CO interpolymer is an ethylene/CO copolymer.

In one embodiment, the ethylene/CO interpolymer has a weight average molecular weight (cc-GPC Mw) ≥100,000 g/mol, ≥130,000 g/mol, or ≥135,000 g/mol, or ≥140,000 g/mol, or ≥145,000 g/mol. In one embodiment, the ethylene/CO interpolymer has a weight average molecular weight (cc-GPC Mw)≤200,000 g/mol, or ≤195,000 g/mol, or ≤190,000 g/mol, or ≤185,000 g/mol, or ≤180,000 g/mol. In a further embodiment, the ethylene/CO interpolymer is an ethylene/CO copolymer.

In one embodiment, the ethylene/CO interpolymer has a weight average molecular weight (Mw) from 135,000 g/mol to 190,000 g/mol, further from 140,000 g/mol to 185,000 g/mol, further from 145,000 g/mol to 180,000 g/mol, as determined by conventional GPC. In a further embodiment, the ethylene/CO interpolymer is an ethylene/CO copolymer.

In alternative embodiments, the the ethylene/CO interpolymer may have a weight average molecular weight (cc-GPC Mw) from 60,000 to 150,000 g/mol, or from 65,000 to 150,000 g/mol, or from from 70,000 to 145,000 g/mol.

In one embodiment, the ethylene/CO interpolymer has a Tan Delta (0.1 rad/sec, 190° C.) ≥1.50, ≥2.00, ≥3.00, or ≥3.10, or ≥3.20, or ≥3.30, or ≥3.40. In a further embodiment, the ethylene/CO interpolymer is an ethylene/CO copolymer. In one embodiment, the ethylene/CO interpolymer has a Tan Delta (0.1 rad/sec, 190° C.)≤6.40, or ≤6.20, or ≤6.00, or ≤5.80, or ≤5.60 g/mol. In a further embodiment, the ethylene/CO interpolymer is an ethylene/CO copolymer.

In one embodiment, the ethylene/CO interpolymer has a viscosity (0.1 rad/sec, 190° C.) ≥1800 Pa·s, ≥2,000 Pa·s, or ≥2,200 Pa·s, or ≥2,400 Pa·s, or ≥2,600 Pa·s, or ≥2,800 Pa·s. In a further embodiment, the ethylene/CO interpolymer is an ethylene/CO copolymer. In one embodiment, the ethylene/CO interpolymer has a viscosity (0.1 rad/sec, 190° C.)≤5,000 Pa·s, or ≤4,800 Pa·s, or ≤4,600 Pa·s, or ≤4,400 Pa·s, or ≤4,200 Pa·s, or ≤4,000 Pa·s, or ≤25,000 Pa·s. In a further embodiment, the ethylene/CO interpolymer has a viscosity (0.1 rad/sec, 190° C.) from 1800 to 30,000 Pa·s, or from 2000 to 25,000 Pa·s In a further embodiment, the ethylene/CO interpolymer is an ethylene/CO copolymer.

In one embodiment, the ethylene/CO interpolymer has a viscosity (100 rad/sec, 190° C.) ≥200 Pa·s, ≥220 Pa·s, ≥240 Pa·s, ≥260 Pa·s, or ≥270 Pa·s, or ≥280 Pa·s, or ≥290 Pa·s, or ≥300 Pa·s. In a further embodiment, the ethylene/CO interpolymer is an ethylene/CO copolymer. In one embodiment, the ethylene/CO interpolymer has a viscosity (100 rad/sec, 190° C.)≤370 Pa·s, or ≤360 Pa·s, or ≤350 Pa·s, or ≤340 Pa·s, or ≤330 Pa·s, or ≤320 Pa·s, or ≤800 Pa·s. In a further embodiment, the ethylene/CO interpolymer has a viscosity (100 rad/sec, 190° C.) from 200 to 1000 Pa·s, or from 220 to 800 Pa·s. In a further embodiment, the ethylene/CO interpolymer is an ethylene/CO copolymer.

In one embodiment, the ethylene/CO interpolymer has a viscosity ratio (V0.1/V100, 190° C.) ≥7.0, or ≥7.5, or ≥8.0, or ≥8.5, or ≥9.0, or ≥9.5, or ≥15, or ≥20, or ≥30. In a further embodiment, the ethylene/CO interpolymer is an ethylene/CO copolymer. In one embodiment, the ethylene/CO interpolymer has a viscosity ratio (V0.1/V100, 190° C.)≤15.5, or ≤15.0, or ≤14.5, or ≤14.0, or ≤13.5, or ≤13.0, or ≤12.0, or ≤11.0. In a further embodiment, the ethylene/CO interpolymer is an ethylene/CO copolymer.

In one embodiment, the ethylene/CO interpolymer has a gpcBR ≥2.45, or ≥2.50, or ≥2.55, or ≥2.60, or ≥2.65, or ≥2.70. In a further embodiment, the ethylene/CO interpolymer is an ethylene/CO copolymer. In one embodiment, the ethylene/CO interpolymer has a gpcBR ≤3.20, or ≤3.15, or ≤3.10, or ≤3.05, or ≤3.00, or ≤2.95. In a further embodiment, the ethylene/CO interpolymer is an ethylene/CO copolymer. In one embodiment, the ethylene-based polymer has a gpcBR from 2.50 to 3.20, further from 2.60 to 3.10, further from 2.70 to 3.00. In a further embodiment, the ethylene/CO interpolymer is an ethylene/CO copolymer. In one embodiment, the ethylene-based polymer has a gpcBR from 1.00 to 3.20, or from 1.10 to 3.10, or from 1.10 to 3.00.

In one embodiment, the ethylene/CO interpolymer has an amyl (C5) group level ≥0.50 amyl group per 1000 carbon atoms, or ≥0.75 amyl group per 1000 carbon atoms, or ≥1.00 amyl group per 1000 carbon atoms, or ≥1.10 amyl group per 1000 carbon atoms, or ≥1.20 amyl group per 1000 carbon atoms, as determined by 13C NMR. In a further embodiment, the ethylene/CO interpolymer is an ethylene/CO copolymer. In one embodiment, the ethylene/CO interpolymer has an amyl (C5) group level ≤5.00 amyl group per 1000 carbon atoms, or ≤4.00 amyl group per 1000 carbon atoms, or ≤3.00 amyl group per 1000 carbon atoms, or ≤2.00 amyl group per 1000 carbon atoms, as determined by 13C NMR. In a further embodiment, the ethylene/CO interpolymer is an ethylene/CO copolymer.

In one embodiment, the ethylene/CO interpolymer has a vinyl group level ≥0.030 vinyl group per 1000 carbon atoms, ≥0.035 vinyl group per 1000 carbon atoms, ≥0.050 vinyl group per 1000 carbon atoms, or ≥0.055 vinyl group per 1000 carbon atoms, or ≥0.060 vinyl group per 1000 carbon atoms, or ≥0.065 vinyl group per 1000 carbon atoms, or ≥0.070 vinyl group per 1000 carbon atoms, as determined by 1H NMR. In a further embodiment, the ethylene/CO interpolymer is an ethylene/CO copolymer. In one embodiment, the ethylene/CO interpolymer has an vinyl group level ≤0.250 vinyl group per 1000 carbon atoms, ≤0.200 vinyl group per 1000 carbon atoms, ≤0.110 vinyl group per 1000 carbon atoms, or ≤0.105 vinyl group per 1000 carbon atoms, or ≤0.100 vinyl group per 1000 carbon atoms, or ≤0.090 vinyl group per 1000 carbon atoms, or ≤0.095 vinyl group per 1000 carbon atoms as determined by 1H NMR. In a further embodiment, the ethylene/CO interpolymer is an ethylene/CO copolymer.

In one embodiment, the ethylene/CO interpolymer has a total unsaturation level ≥0.15 unsaturation per 1000 carbon atoms, ≥0.20 unsaturation per 1000 carbon atoms, or ≥0.22 unsaturation per 1000 carbon atoms, or ≥0.24 unsaturation per 1000 carbon atoms, or ≥0.26 unsaturation per 1000 carbon atoms, or ≥0.28 unsaturation per 1000 carbon atoms, as determined by 1H NMR. In a further embodiment, the ethylene/CO interpolymer is an ethylene/CO copolymer. In one embodiment, the ethylene/CO interpolymer has an unsaturation level ≤0.60 unsaturation per 1000 carbon atoms, ≤0.55 unsaturation per 1000 carbon atoms, ≤0.44 unsaturation per 1000 carbon atoms, or ≤0.42 unsaturation per 1000 carbon atoms, or ≤0.40 unsaturation per 1000 carbon atoms, or ≤0.38 unsaturation per 1000 carbon atoms, or ≤0.36 unsaturation per 1000 carbon atoms as determined by 1H NMR. In a further embodiment, the ethylene/CO interpolymer is an ethylene/CO copolymer.

In one embodiment, the ethylene/CO interpolymer comprises ≥80 wt %, or ≥85 wt %, polymerized ethylene, based on the weight of the interpolymer. In a further embodiment, the ethylene/CO interpolymer is an ethylene/CO copolymer. In one embodiment, the ethylene/CO interpolymer comprises ≥90 wt %, or ≥95 wt %, polymerized ethylene, based on the weight of the interpolymer. In a further embodiment, the ethylene/CO interpolymer is an ethylene/CO copolymer.

In one embodiment, the ethylene/CO interpolymer is a low density polyethylene (LDPE) that comprises CO comonomer. In a further embodiment, the ethylene/CO interpolymer is an ethylene/CO copolymer.

In one embodiment, the ethylene/CO interpolymer is a copolymer, comprising, in polymerized form, ethylene and CO as the only monomer types. In a further embodiment, the ethylene/CO copolymer comprises a majority amount of polymerized ethylene, based on the weight of the copolymer. In a further embodiment, the ethylene/CO copolymer comprises ≥90 wt %, or ≥95 wt %, or ≥98 wt % polymerized ethylene, based on the weight of the copolymer.

In one embodiment, the ethylene/CO interpolymer is present at ≥10 wt %, or ≥20 wt %, or ≥30 wt %, or ≥40 wt %, or ≥50 wt %, or ≥60 wt %, or ≥70 wt %, or ≥80 wt %, or ≥90 wt %, or ≥95 wt %, or ≥98 wt %, or ≥99 wt %, based on the weight of the composition. In a further embodiment, the ethylene/CO interpolymer is an ethylene/CO copolymer.

In one embodiment, the ethylene/CO interpolymer is present in an amount from 10 to 50 wt %, or from 20 to 40 wt %, based on the weight of the composition. In a further embodiment, the ethylene/CO interpolymer is an ethylene/CO copolymer. In one embodiment, the ethylene/CO interpolymer is present in an amount from 60 to 90 wt %, or from 65 to 85 wt %, based on the weight of the composition. In a further embodiment, the ethylene/CO interpolymer is an ethylene/CO copolymer. In one embodiment, the ethylene/CO interpolymer is present in an amount from 1.0 to 10 wt %, or from 1.5 to 5.0 wt %, based on the weight of the composition. In a further embodiment, the ethylene/CO interpolymer is an ethylene/CO copolymer.

In one embodiment, the composition further comprises a second ethylene-based polymer. In a further embodiment, the second ethylene-based polymer is selected from a LDPE, an ethylene/alpha-olefin interpolymer, or a combination thereof.

In one embodiment, the composition further comprises another ethylene-based polymer that differs in one or more properties, such as density, melt index, comonomer, comonomer content, etc., from the ethylene/CO interpolymer, and further copolymer. Suitable other ethylene-based polymers include, but are not limited to, DOWLEX Polyethylene Resins, TUFLIN Linear Low Density Polyethylene (LLDPE) Resins, ELITE and/or ELITE AT Enhanced Polyethylene Resins (all available from The Dow Chemical Company), high density polyethylenes (d≥0.955 g/cc), medium density polyethylenes (density from 0.935 to 0.955 g/cc), EXCEED polymers and ENABLE polymers (both from ExxonMobil), LDPE, and EVA (ethylene vinyl acetate).

In one embodiment, the composition further comprises a propylene-based polymer. Suitable propylene-based polymers include polypropylene homopolymers, propylene/α-olefin interpolymers and copolymers, and propylene/ethylene interpolymers and copolymers.

In one embodiment, the composition further comprises a heterogeneously branched ethylene/α-olefin interpolymer, and preferably a heterogeneously branched ethylene/α-olefin copolymer. In one embodiment, the heterogeneously branched ethylene/α-olefin inter-polymer, and preferably a heterogeneously branched ethylene/α-olefin copolymer, has a density from 0.89 to 0.94 g/cc, further from 0.90 to 0.93 g/cc. In a further embodiment, the composition comprises from 1 to 99 weight percent, further from 15 to 85 weight percent, of the ethylene/CO interpolymer, based on the weight of the composition. In a further embodiment, the ethylene/CO interpolymer is an ethylene/CO copolymer.

In one embodiment, the composition comprises less than 5 ppm, further less than 2 ppm, further less than 1 ppm, and further less than 0.5 ppm, sulfur, based on the weight of the composition. In one embodiment, the composition does not contain sulfur.

In one embodiment, the composition comprises from 1.5 to 80 wt %, based on the weight of the composition, of the ethylene/CO interpolymer, and further an ethylene/CO copolymer. In a further embodiment, the composition further comprises a LLDPE.

In one embodiment, the composition comprises from 1.5 to 20 wt %, based on the weight of the composition, of the ethylene/CO interpolymer, and further an ethylene/CO copolymer. In a further embodiment, the composition further comprises a LLDPE.

In one embodiment, the composition comprises from 20 to 80 wt %, or from 30 to 80 wt %, or from 40 to 80 wt %, or from 50 to 80 wt %, based on the weight of the composition, of the ethylene/CO interpolymer, and further an ethylene/CO copolymer. In a further embodiment, the composition further comprises a LLDPE.

An inventive composition may comprise a combination of two or more embodiments as described herein. An inventive ethylene/CO interpolymer may comprise a combination of two or more embodiments as described herein. An inventive ethylene/CO copolymer may comprise a combination of two or more embodiments as described herein.

Also provided is an article comprising at least one component formed from the composition of one or more embodiments described herein. In a further embodiment, the article is a coated substrate or a film.

In one embodiment, the article is a coating, which is produced by extrusion coating or extrusion lamination. In one embodiment, the article is a coated substrate. In a further embodiment, the substrate is a paper product. In one embodiment, the article is a laminated substrate. In a further embodiment, the substrate is a paper product. In one embodiment, the article is produced by extrusion coating or extrusion lamination. An inventive article may comprise a combination of two or more embodiments as described herein.

The invention also provides a coating formed from the composition of one or more embodiments described herein. An inventive coating may comprise a combination of two or more embodiments as described herein.

Also is provided a process to form the composition of one or more embodiments described herein, said process comprising polymerizing ethylene and CO, using a high pressure, free-radical polymerization process, to form the ethylene/CO interpolymer, and wherein the polymerization takes place in a reactor configuration comprising at least one autoclave reactor comprising ≥2 reaction zones, and at least one tubular reactor comprising ≥2 reaction zones, and wherein in the autoclave reactor, the polymerizations takes place in the presence of at least one "medium temperature free-radical initiator" denoted $FRm_{auto}$, and at least one "low temperature free-radical initiator" denoted $FRl_{auto}$, and wherein the weight ratio ($ratio_{auto}$) of the $FRm_{auto}$ to $FRl_{auto}$ is from 0.04 to 1.00 for each reaction zone in the autoclave reactor; and wherein in the tubular reactor, the polymerizations takes place in the presence of at least one "high temperature free-radical initiator" denoted $FRh_{tube}$, and at least one "medium temperature free-radical initiator" denoted $FRm_{tube}$, and wherein the weight ratio ($ratio_{tube}$) of the $FRh_{tube}$ to $FRm_{tube}$ is from 0.06 to 0.50 for each reaction zone in the tubular reactor. In a further embodiment, the ethylene/CO interpolymer is an ethylene/CO copolymer.

In one embodiment, the weight ratio ($ratio_{auto}$) of the $FRm_{auto}$ to $FRl_{auto}$ for each reaction zone in the autoclave reactor, ≥0.05, or ≥0.06, or ≥0.07, or ≥0.08, or ≥0.09, or ≥0.10, or ≥0.11, or ≥0.12. In a further embodiment, the ethylene/CO interpolymer is an ethylene/CO copolymer. In one embodiment, the weight ratio ($ratio_{auto}$) of the $FRm_{auto}$ to $FRl_{auto}$ for each reaction zone in the autoclave reactor, ≤0.90, or ≤0.80, or ≤0.70, or ≤0.60, or ≤0.50, or ≤0.40. In a further embodiment, the ethylene/CO interpolymer is an ethylene/CO copolymer.

In one embodiment, the weight ratio ($ratio_{tube}$) of the $FRh_{tube}$ to $FRm_{tube}$ for each reaction e, zone in the tubular reactor, ≥0.07, or ≥0.08, or ≥0.09, or ≥0.10, or ≥0.11. In a further embodiment, the ethylene/CO interpolymer is an ethylene/CO copolymer. In one embodiment, the weight ratio ($ratio_{tube}$) of the $FRh_{tube}$ to $FRm_{tube}$ for each reaction zone in the tubular reactor, ≤0.45, or ≤0.40, or ≤0.35, or ≤0.30, or ≤0.25, or ≤0.20. In a further embodiment, the ethylene/CO interpolymer is an ethylene/CO copolymer.

In one embodiment, for the autoclave reactor, the weight ratio of "the amount of ethylene added to a reaction zone" to "the amount of CO added to the same reaction zone" is ≥30, or ≥35, or ≥40, or ≥45, or ≥50, or ≥55, or ≥60, or ≥65. In a further embodiment, the ethylene/CO interpolymer is an ethylene/CO copolymer. In one embodiment, the weight ratio of "the amount of ethylene added to a reaction zone" to "the amount of CO added to the same reaction zone" is ≤400, or ≤395, or ≤390, or ≤385, or ≤380, or ≤375. In a further embodiment, the ethylene/CO interpolymer is an ethylene/CO copolymer.

In one embodiment, for the autoclave reactor, the weight ratio of "the amount of ethylene added to a reaction zone" to "the amount of CO added to the same reaction zone" is ≥95, or ≥100, or ≥105, or ≥110. In a further embodiment, the ethylene/CO interpolymer is an ethylene/CO copolymer. In one embodiment, the weight ratio of "the amount of ethylene added to a reaction zone" to "the amount of CO added to the same reaction zone" is ≤205, or ≤200, or ≤195, or ≤190, or ≤185, or ≤180. In a further embodiment, the ethylene/CO interpolymer is an ethylene/CO copolymer.

In one embodiment, for the autoclave reactor, the weight ratio of "the amount of ethylene added to a reaction zone" to "the amount of CO added to the same reaction zone" is from 388 to 39. In a further embodiment, the ethylene/CO interpolymer is an ethylene/CO copolymer.

In one embodiment, the polymerization temperature in each reaction zone of the autoclave reactor is, independently, from 190° C. to 270° C., or from 200° C. to 260° C., or from 210° C. to 250° C., or from 220° C. to 240° C. In a further embodiment, the ethylene/CO interpolymer is an ethylene/CO copolymer.

In one embodiment, the polymerization temperature of each reaction zone of the autoclave reactor is, independently, ≤250° C., or ≤245° C., or ≤240° C., or ≤235° C. In a further embodiment, the ethylene/CO interpolymer is an ethylene/CO copolymer.

In one embodiment, the polymerization temperature in each reaction zone of the tubular reactor is, independently, from 260° C. to 300° C., or from 265° C. to 295° C., or from 270° C. to 290° C., or from 270° C. to 285° C. In a further embodiment, the ethylene/CO interpolymer is an ethylene/CO copolymer.

An inventive process may comprise a combination of two or more embodiments as described herein.

Process

For producing the ethylene/CO interpolymer or copolymer, as described herein, a high pressure, free-radical initiated polymerization is used. Two different high pressure free-radical initiated polymerization process types are known. In the first type, an agitated autoclave vessel having one or more reaction zones is used. The autoclave reactor normally has several injection points for initiator or monomer feeds, or both. In the second type, a jacketed tube is used as a reactor, which has one or more reaction zones. Suitable, but not limiting, reactor lengths may be from 100 to 3000 meters (m), or from 1000 to 2000 m. The beginning of a reaction zone for either type of reactor is typically defined by the side injection of either initiator for the reaction, ethylene, chain transfer agent (or telomer), comonomer(s), as well as any combination thereof. A high pressure process can be carried out in autoclave or tubular reactors having one or more reaction zones, or in a combination of autoclave and tubular reactors, each comprising one or more reaction zones.

A chain transfer agent (CTA) can be used to control molecular weight. In one embodiment, one or more chain transfer agents (CTAs) are added to an inventive polymerization process. Typical CTAs that can be used include, but are not limited to, propylene, isobutane, n-butane, 1-butene, methyl ethyl ketone, acetone, and propionaldehyde. In one embodiment, the amount of CTA used in the process is from 0.03 to 10 weight percent of the total reaction mixture.

Ethylene used for the production of the ethylene/CO interpolymer may be purified ethylene, which is obtained by removing polar components from a loop recycle stream, or by using a reaction system configuration, such that only fresh ethylene is used for making the inventive polymer. It is not typical that only purified ethylene is required to make the ethylene-based polymer. In such cases, ethylene from a recycle loop may be used.

Additives

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10 percent (by the combined weight) of one or more additives, based on the weight of the inventive polymer composition.

In one embodiment, the polymers of this invention are treated with one or more stabilizers, for example, antioxidants, such as IRGANOX 1010, IRGANOX 1076 and IRGAFOS 168 (Ciba Specialty Chemicals; Glattbrugg, Switzerland). In general, the polymers are treated with one or more stabilizers before extrusion or other melt processes. Processing aids, such as plasticizers, include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils, useful as processing aids, include white mineral oil such as KAYDOL oil (Chemtura Corp.; Middlebury, Conn.) and SHELLFLEX 371 naphthenic oil (Shell Lubricants; Houston, Tex.). One other suitable oil is TUFFLO oil (Lyondell Lubricants; Houston, Ill.).

Blends and mixtures of the inventive polymer with other polymers may be performed. Suitable polymers for blending with the inventive polymer include natural and synthetic polymers. Exemplary polymers for blending include propylene-based polymers (for example, impact modifying polypropylene, isotactic polypropylene, atactic polypropylene, and random ethylene/propylene copolymers), various types of ethylene-based polymers, including high pressure, free-radical LDPE, LLDPE prepared with Ziegler-Natta catalysts, PE (polyethylene) prepared with single site catalysts, including multiple reactor PE ("in reactor" blends of Ziegler-Natta PE and single site catalyzed PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)); EVA; ethylene/vinyl alcohol copolymers; polystyrene; impact modified polystyrene; ABS; styrene/butadiene block copolymers and hydrogenated derivatives thereof (SBS and SEBS); and thermoplastic polyurethanes. Homogeneous polymers, such as olefin plastomers and elastomers, ethylene and propylene-based copolymers (for example, polymers available under the trade designation VERSIFY Plastomers & Elastomers (The Dow Chemical Company) and VISTAMAXX (ExxonMobil Chemical Co.) can also be useful as components in blends comprising the inventive polymer).

Applications

The composition comprising the ethylene/CO interpolymer may be used in a variety of extrusion coating applications, such as sugar pouches, paperboard hot and cold drink cups, gable top cartons, non-wovens, woven substrates, tooth paste tubes, stand up pouches, or any other substrate where traditional LDPE or LLDPE (or blends of either) polymers would be disadvantaged due to inferior adhesion. The inventive polymer could also be used in a variety of extrusion laminations, where the advantage would be improved adhesion in the multi-layer structures, such as aseptic drink boxes, snack packaging, ream wrap, stand up pouches, tooth paste tubes, cheese packaging, lamination films, or any other extrusion lamination where LDPE or LLDPE (or blends of either) would be disadvantaged due to inferior adhesion.

The compositions of this invention may be employed in a variety of conventional thermoplastic fabrication processes to produce useful articles, including, monolayer and multi-layer films produced by a blown film process (e.g., an air quenched blown film process), by a cast film or cast sheet process (e.g., quenching an extruded molten polymer using a chilled roller), or by film or sheet extrusion (e.g., such as through a water-bath). In addition to films, these articles may also include molded articles, such as blow molded, injection molded, or rotomolded articles; coatings; fibers; and woven or non-woven fabrics.

The composition comprising the ethylene/CO interpolymer may be used in a variety of films, including but not limited to, extrusion coating, food packaging, consumer, industrial, agricultural (applications or films), lamination films, fresh cut produce films, meat films, cheese films, candy films, clarity shrink films, collation shrink films, stretch films, silage films, greenhouse films, fumigation films, liner films, stretch hood, heavy duty shipping sacks, pet food, sandwich bags, sealants, and diaper backsheets.

The composition comprising the ethylene/CO interpolymer may also be used for wire and cable coating operations, in sheet extrusion for vacuum forming operations, and forming molded articles, including the use of injection molding, blow molding process, or rotomolding processes. Other suitable applications for the inventive polymers include elastic films and fibers; soft touch goods, such as appliance handles; gaskets and profiles; auto interior parts and profiles; foam goods (both open and closed cell); impact modifiers for other thermoplastic polymers, such as high density polyethylene, or other olefin polymers; cap liners; and flooring.

Definitions

The phrase "high pressure, free-radical polymerization process," as used herein, refers to a free radical initiated polymerization carried out at an elevated pressure of at least 1000 bar (100 MPa).

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer.

The term "interpolymer," as used herein, refers to polymers prepared by the polymerization of at least two different types of monomers. The generic term interpolymer includes copolymers (employed to refer to polymers prepared from two different types of monomers), and polymers prepared from more than two different types of monomers.

The term "ethylene-based polymer," as used herein, refers to a polymer that comprises 50 wt % or a majority amount of polymerized ethylene monomer (based on weight of the polymer) and, optionally, may contain at least one comonomer.

The term "ethylene/α-olefin interpolymer," as used herein, refers to an interpolymer that comprises 50 wt % or a majority amount of polymerized ethylene monomer (based on the weight of the interpolymer) and at least one α-olefin.

The term, "ethylene/α-olefin copolymer," as used herein, refers to a copolymer that comprises 50 wt % or a majority amount of polymerized ethylene monomer (based on the weight of the copolymer), and an α-olefin, as the only two monomer types.

The term "ethylene/CO interpolymer," as used herein, refers to an interpolymer that comprises 50 wt % or a majority amount of polymerized ethylene monomer (based on the weight of the interpolymer) and carbon monoxide (CO). The term, "ethylene/CO copolymer," as used herein, refers to a copolymer that comprises 50 wt % or a majority amount of polymerized ethylene monomer (based on the weight of the copolymer), and carbon monoxide (CO), as the only two monomer types.

The term "propylene-based polymer," as used herein, refers to a polymer that comprises a majority amount of polymerized propylene monomer (based on weight of the polymer) and, optionally, may comprise at least one comonomer.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at the molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "reactor system," as used herein, refers to the components (devices) used to polymerize and isolate a polymer. Such components/devices include, but are not limited to, one or more reactors, a Secondary-compressor, a Primary compressor, and a Booster compressor. The term "reactor configuration," as used herein, refers to one or more reactors (for example, autoclave and/or tubular reactors), and optionally one or more reactor pre-heaters, used to polymerize a polymer. The reactors may be jacketed.

The term "reaction zone," as used herein, refers to a reactor zone where polymerization reaction is initiated or reinitiated by the addition of free radicals and/or the decomposition of components into free radicals, and/or the decomposition of components to generate free radicals.

The term "polymerization temperature," in a reaction zone," or similar phrases, as used herein, refers to the highest temperature measured in a reaction zone. In an autoclave reaction zone (typically, noted as a maximum zone temperature), and in a tubular reaction zone (typically noted as a peak temperature).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically listed.

Test Methods

Density

Samples for density measurements were prepared according to ASTM D 4703-10. Samples were pressed at 374° F. (190° C.), for five minutes, at 10,000 psi (68 MPa). The temperature was maintained at 374° F. (190° C.) for the above five minutes, and then the pressure was increased to 30,000 psi (207 MPa) for three minutes. This was followed by a one minute hold at 70° F. (21° C.) and 30,000 psi (207 MPa). Measurements were made within one hour of sample pressing using ASTM D792-08, Method B.

Melt Index

Melt index, or I2, was measured in accordance with ASTM D 1238-10, Condition 190° C./2.16 kg, Method B, and was reported in grams eluted per 10 minutes.

Nuclear Magnetic Resonance ($^{13}$C NMR)

Samples were prepared by adding approximately "3 g" of a "50/50 mixture of tetrachloroethane-d2/orthodichlorobenzene, containing 0.025 M Cr(AcAc)$_3$," to a "0.25 to 0.40 g" polymer sample, in a 10 mm NMR tube. Oxygen was removed from the sample by placing the open tubes in a nitrogen environment for at least 45 minutes. The samples were then dissolved, and homogenized, by heating the tube and its contents to 150° C., using a heating block and heat gun. Each dissolved sample was visually inspected to ensure homogeneity. Samples were thoroughly mixed, immediately prior to analysis, and were not allowed to cool before insertion into the heated NMR sample holders.

All data were collected using a Bruker 400 MHz spectrometer. The data was acquired using a six second pulse repetition delay, 90-degree flip angles, and inverse gated decoupling, with a sample temperature of 120° C. All measurements were made on non-spinning samples in locked mode. Samples were allowed to thermally equilibrate for seven minutes prior to data acquisition. The 13C NMR chemical shifts were internally referenced to the EEE triad at 30.0 ppm. The "C6+" value is a direct measure of C6+ branches in LDPE, where the long branches are not distinguished from "chain ends." The "32.2 ppm" peak, representing the third carbon from the end of all chains or branches of six or more carbons, is used to determine the "C6+" value. CO units per 1000C is determined as the integral of the 43 ppm peak divided by 2. In the Ethylene/CO copolymers, the mol % CO and the wt % CO values are the same. Mol % CO is calculated from: CO units/1000C=moles CO per 1000 total carbons; Mols ethylene=(1000−CO units/1000C)/2.

Nuclear Magnetic Resonance ($^1$H NMR)

Sample Preparation

The samples were prepared by adding approximately 130 mg of sample to "3.25 g of 50/50, by weight, tetrachlorethane-d2/perchloroethylene" with 0.001 M Cr(AcAc)$_3$, in a NORELL 1001-7, 10 mm NMR tube. The samples were purged by bubbling N2 through the solvent, via a pipette inserted into the tube, for approximately five minutes, to prevent oxidation. Each tube was capped, sealed with TEFLON tape, and then soaked at room temperature, overnight, to facilitate sample dissolution. The samples were kept in a N2 purge box, during storage, before, and after, preparation, to minimize exposure to O2. The samples were heated and vortexed at 115° C. to ensure homogeneity.

Data Acquisition Parameters

The 1H NMR was performed on a Bruker AVANCE 400 MHz spectrometer, equipped with a Bruker Dual DUL high-temperature CryoProbe, and a sample temperature of 120° C. Two experiments were run to obtain spectra, a control spectrum to quantitate the total polymer protons, and a double presaturation experiment, which suppressed the intense polymer backbone peaks, and enabled high sensitivity spectra for quantitation of the end-groups. The control was run with ZG pulse, 4 scans, SWH 10,000 Hz, AQ 1.64s, D1 14s. The double presaturation experiment was run with a modified pulse sequence, TD 32768, 100 scans, DS 4, SWH 10,000 Hz, AQ 1.64s, D1 1s, D13 13s.

Data Analysis—1H NMR Calculations

The signal from residual 1H in TCE(Tetrachloroethane)-d2 (at 6.0 ppm) was integrated, and set to a value of 100, and the integral from 3 to −0.5 ppm was used as the signal from the whole polymer in the control experiment. For the presaturation experiment, the TCE signal was also set to 100, and the corresponding integrals for unsaturation (vinylene at about 5.40 to 5.60 ppm, trisubstituted at about 5.16 to 5.35 ppm, vinyl at about 4.95 to 5.15 ppm, and vinylidene at about 4.70 to 4.90 ppm) were obtained.

In the presaturation experiment spectrum, the regions for cis- and trans-vinylene, trisubstituted, vinyl, and vinylidene were integrated. The integral of the whole polymer from the control experiment was divided by two, to obtain a value representing X thousands of carbons (i.e., if the polymer integral=28,000, this represents 14,000 carbons, and X=14).

The unsaturated group integrals, divided by the corresponding number of protons contributing to that integral, represent the moles of each type of unsaturation per X thousand carbons. Dividing the moles of each type of unsaturation by X, then gives the moles of unsaturated groups per 1000 moles of carbons.

Melt Strength

Melt strength measurements were conducted on a Gottfert Rheotens 71.97 (Goettfert Inc.; Rock Hill, S.C.), attached to a Gottfert Rheotester 2000 capillary rheometer. The melted sample (about 25 to 30 grams) was fed with a Goettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston was run at a constant piston speed of 0.265 mm/second. The standard test temperature was 190° C. The sample was drawn uniaxially to a set of accelerating nips, located 100 mm below the die, with an acceleration of 2.4 mm/s$^2$. The tensile force was recorded as a function of the take-up speed of the nip rolls. Melt strength was reported as the plateau force (cN) before the strand broke. The following conditions were used in the melt strength measurements: plunger speed=0.265 mm/second; wheel acceleration=2.4 mm/s²; capillary diameter=2.0 mm; capillary length=30 mm; and barrel diameter=12 mm.

Dynamic Mechanical Spectroscopy (DMS)

Resins were compression-molded into "3 mm thick×1 inch" circular plaques at 350° F., for five minutes, under 1500 psi pressure, in air. The sample was then taken out of the press, and placed on a counter to cool.

A constant temperature frequency sweep was performed using a TA Instruments "Advanced Rheometric Expansion System (ARES)," equipped with 25 mm (diameter) parallel plates, under a nitrogen purge. The sample was placed on the plate, and allowed to melt for five minutes at 190° C. The plates were then closed to a gap of "2 mm," the sample trimmed (extra sample that extends beyond the circumference of the "25 mm diameter" plate was removed), and then the test was started. The method had an additional five minute delay built in, to allow for temperature equilibrium. The experiments were performed at 190° C. over a frequency range of 0.1 to 100 rad/s. The strain amplitude was constant at 10%. The complex viscosity $\eta^*$, tan ($\delta$) or tan delta, viscosity at 0.1 rad/s (V0.1), the viscosity at 100 rad/s (V100), and the viscosity ratio (V0.1/V100) were calculated from these data.

Triple Detector Gel Permeation Chromatography (TDGPC)—Conventional GPC, Light Scattering GPC, Viscometry GPC and gpcBR For the GPC techniques used herein (Conventional GPC, Light Scattering GPC, and gpcBR), a Triple Detector Gel Permeation Chromatography (3D-GPC or TDGPC) system was used. This system consisted of a Waters (Milford, Mass.) model 150C High Temperature Chromatograph (other suitable high temperatures GPC instruments include Polymer Laboratories (Shropshire, UK) Model 210 and Model 220), equipped with a Precision Detectors (Amherst, Mass.) 2-angle laser light scattering (LS) detector Model 2040, an IR4 infra-red detector from Polymer ChAR (Valencia, Spain), and a Viscotek (Houston, Tex.) 150R 4-capillary solution viscometer (DP).

A GPC with these latter two independent detectors and at least one of the former detectors is sometimes referred to as "3D-GPC" or "TDGPC," while the term "GPC" alone generally refers to conventional GPC. Data collection was performed using Viscotek TriSEC software, Version 3, and a 4-channel Viscotek Data Manager DM400. The system was also equipped with an on-line solvent degassing device from Polymer Laboratories (Shropshire, United Kingdom).

The eluent from the GPC column set flowed through each detector arranged in series, in the following order: LS detector, IR4 detector, then DP detector. The systematic approach for the determination of multi-detector offsets was performed in a manner consistent with that published by Balke, Mourey, et al. (Mourey and Balke, Chromatography Polym., Chapter 12, (1992)) (Balke, Thitiratsakul, Lew, Cheung, Mourey, Chromatography Polym., Chapter 13, (1992)), optimizing triple detector log (MW and intrinsic viscosity) results from using a broad polyethylene standard, as outlined in the section on Light Scattering (LS) GPC below, in the paragraph following Equation (5).

Suitable high temperature GPC columns can be used, such as four 30 cm long Shodex HT803 13 micron columns, four 30 cm Polymer Labs columns of 20-micron mixed-pore-size packing (MixA LS, Polymer Labs), or four 30 cm Olexis-LS columns of 13-micron mixed-pore-size packing (Polymer Labs). Here, the Olexis-LS columns were used. The sample carousel compartment was operated at 140° C., and the column compartment was operated at 150° C. The samples were prepared at a concentration of "0.1 grams of polymer in 50 milliliters of solvent." The chromatographic solvent and the sample preparation solvent was 1,2,4-trichlorobenzene (TCB) containing "200 ppm of 2,6-di-tert-butyl-4methylphenol (BHT)." The solvent was sparged with nitrogen. The polymer samples were gently stirred at 160° C. for four hours. The injection volume was 200 microliters. The flow rate through the GPC was set at 1 ml/minute.

Conventional GPC

For Conventional GPC, the IR4 detector was used, and the GPC column set was calibrated by running 21 narrow molecular weight distribution polystyrene standards. The molecular weight (MW) of the standards ranged from 580 g/mol to 8,400,000 g/mol, and the standards were contained in 6 "cocktail" mixtures. Each standard mixture had at least a decade of separation between individual molecular weights. The standard mixtures were purchased from Polymer Laboratories. The polystyrene standards were prepared at "0.025 g in 50 mL of solvent" for molecular weights equal to, or greater than, 1,000,000 g/mol, and at "0.05 g in 50 mL of solvent" for molecular weights less than 1,000,000 g/mol. The polystyrene standards were dissolved at 80° C., with gentle agitation, for 30 minutes. The narrow standards mixtures were run first, and in order of decreasing highest molecular weight component, to minimize degradation. The polystyrene standard peak molecular weights were converted to polyethylene molecular weight using Equation (1) (as described in Williams and Ward, J. Polym. Sci., Polym. Letters, 6, 621 (1968)):

$$M\text{polyethylene} = A \times (M\text{polystyrene})^B \quad \text{(Eq. 1)},$$

where M is the molecular weight of polyethylene or polystyrene (as marked), and B is equal to 1.0. It is known to those of ordinary skill in the art that A may be in a range of about 0.38 to about 0.44, and is determined at the time of calibration using a broad polyethylene standard, as outlined in the section on Light Scattering (LS) GPC below in the paragraph following Equation (5). Use of this polyethylene calibration method to obtain molecular weight values, such as the molecular weight distribution (MWD or Mw/Mn), and related statistics, is defined here as the modified method of Williams and Ward. The number average molecular weight, the weight average molecular weight, and the z-average molecular weight are calculated from the following equations.

$$Mw_{CC} = \sum_i \left(\frac{C_i}{\sum C_i}\right) M_i = \sum_i w_i M_{cc,i}, \quad \text{(Eq. 2)}$$

$$M_{n,cc} = \sum w_i / \sum (w_i / M_{cc,i}), \quad \text{(Eq. 3)}$$

$$M_{z,cc} = \sum (w_i M_{cc,i}^2) / \sum (w_i M_{cc,i}). \quad \text{(Eq. 4)}$$

Light Scattering (LS) GPC

For the LS GPC, the Precision Detector PDI2040 detector Model 2040 was used. Depending on the sample, either the 15° angle or the 90° angle of the light scattering detector is used for calculation purposes. Here, the 15° angle was used.

The molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration, used in the determination of the molecular weight, was obtained from the mass detector area, and the mass detector constant, derived from a suitable linear polyethylene homopolymer, or one of the polyethylene standards of known weight average molecular weight. The calculated molecular weights were obtained using a light scattering constant, derived from one or more of the polyethylene standards mentioned below, and a refractive index concentration coefficient, do/dc, of 0.104. Generally, the mass detector response and the light scattering constant should be determined from a linear standard with a molecular weight in excess of about 50,000 g/mole. The viscometer calibration can be accomplished using the methods described by the manufacturer, or, alternatively, by using the published values of suitable linear standards, such as Standard Reference Materials (SRM) 1475a (available from National Institute of Standards and Technology (NIST)). The chromatographic concentrations are assumed low enough to eliminate addressing 2nd viral coefficient effects (concentration effects on molecular weight).

With 3D-GPC, absolute weight average molecular weight ("Mw, Abs") is determined using Equation (5) below, using the "peak area" method for higher accuracy and precision. The "LS Area" and the "Conc. Area" are generated by the chromatograph/detectors combination.

$$M_W = \sum_i w_i M_i = \sum_i \left(\frac{C_i}{\sum_i C_i}\right) M_i = \frac{\sum_i C_i M_i}{\sum_i C_i} = \frac{\sum_i LS_i}{\sum_i C_i} = \frac{LS\ \text{Area}}{\text{Conc. Area}}.$$ (Eq. 5)

For each LS profile, the x-axis (log MWcc-GPC), where cc refers to the conventional calibration curve, is determined as follows. First, the polystyrene standards (see above) are used to calibrate the retention volume into "log $MW_{PS}$." Then, Equation 1 (Mpolyethylene=A×(Mpolystyrene)$^B$) is used to convert "log $MW_{PS}$" to "log $MW_{PE}$." The "log $MW_{PE}$" scale serves as the x-axis for the LS profiles of the experimental section (log $MW_{PE}$ is equated to the log MW(cc-GPC)). The y-axis for each LS profile is the LS detector response normalized by the injected sample mass. Initially, the molecular weight and intrinsic viscosity for a linear polyethylene standard sample, such as SRM1475a or an equivalent, are determined using the conventional calibrations ("cc") for both molecular weight and intrinsic viscosity as a function of elution volume.

In the low molecular weight region of the GPC elution curve, the presence of a significant peak that is known to be caused by the presence of anti-oxidant or other additives, will cause an underestimation of the number average molecular weight (Mn) of the polymer sample, to give a overestimation of the sample polydispersity, defined as Mw/Mn, where Mw is the weight average molecular weight. The true polymer sample molecular weight distribution can therefore be calculated from the GPC elution by excluding this extra peak. This process is commonly described as the peak skim feature in data processing procedures in liquid chromatographic analyses. In this process, this additive peak is skimmed off from the GPC elution curve before the sample molecular weight calculation is performed from the GPC elution curve.

Differential Scanning Calorimetry (DSC)

Differential Scanning calorimetry (DSC) was used to measure the melting and crystallization behavior of a polymer over a wide range of temperatures. For example, the TA Instruments Q1000 DSC, equipped with an RCS (refrigerated cooling system) and an autosampler was used to perform this analysis. During testing, a nitrogen purge gas flow of 50 ml/min was used. Each sample was melt pressed into a thin film at about 175° C.; the melted sample was then air-cooled to room temperature (approx. 25° C.). The film sample was formed by pressing a "0.1 to 0.2 gram" sample at 175° C. at 1,500 psi, and 30 seconds, to form a "0.1 to 0.2 mil thick" film. A 3-10 mg, 6 mm diameter specimen was extracted from the cooled polymer, weighed, placed in a light aluminum pan (about 50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C., and held isothermal for five minutes, in order to remove its thermal history. Next, the sample was cooled to −40° C., at a 10° C./minute cooling rate, and held isothermal at −40° C. for five minutes. The sample was then heated to 150° C. (this is the "second heat" ramp) at a 10° C./minute heating rate. The cooling and second heating curves were recorded. The cool curve was analyzed by setting baseline endpoints from the beginning of crystallization to −20° C. The heat curve was analyzed by setting baseline endpoints from −20° C. to the end of melt. The values determined were peak melting temperature ($T_m$), peak crystallization temperature ($T_c$), heat of fusion ($H_f$) (in Joules per gram), and the calculated % crystallinity for each sample was determined using: % Crystallinity=(($H_f$)/(292 J/g))×100.

The heat of fusion ($H_f$) and the peak melting temperature were reported from the second heat curve. Peak crystallization temperature is determined from the cooling curve.

Initiator One-Hour Half-Life Determination

Initiator "one hour half-life" is determined by differential scanning calorimetry-thermal activity monitoring (DSC-TAM) of a dilute solution of the initiator in mono-chlorobenzene. Kinetic data of the decomposition of hydroperoxides in monochlorobenzene are determined titrimetrically. The half-life can be calculated by the Arrhenius equation: $k_d=Ae^{-Ea/RT}$ and $t_{1/2}=\ln(2)/k_d$, where $k_d$ is the rate constant for initiator dissociation in s$^{-1}$; A is the Arrhenius frequency factor in s$^{-1}$; Ea is the activation energy for the initiator dissociation in J/mole; R is 8.3142 J/mole K; T is temperature in K (Kelvin); and $t_{1/2}$ is half-life in seconds (s). A high temperature free-radical initiator is defined as an initiator that has a "one hour half-life" at a temperature in the range from 130° C. to 200° C. A medium temperature free-radical initiator is defined as an initiator that has a "one hour half-life" at a temperature in the range from 90° C. to 129° C. A low temperature free-radical initiator is defined as an initiator that has a "one hour half-life" at a temperature in the range from 30° C. to 89° C.

EXPERIMENTAL

Preparation of Inventive Ethylene-Based Polymers

Inventive Examples 1-15

Inventive Examples were produced on the same process reaction system; therefore, in referring to the same equipment between the runs, the physical process and its units were analogous to one another. FIG. 1 is a block diagram of the process reaction system used to produce the aforementioned Examples.

The process reaction system in FIG. 1 is a partially closed-loop, dual recycle high-pressure, low density polyethylene production system. The process reaction system is comprised of a fresh ethylene feed line 1; a booster/primary compressor "BP", a hyper-compressor "Hyper," a two zone autoclave followed by a two zone tube reactor. The autoclave/tube reactor consists of a first reaction zone 1; a first peroxide initiator line 2; a second reaction zone 2; a second peroxide initiator line 3; a third tube reaction zone 3; a third peroxide initiator line 4; a fourth tube reaction zone 4; a fourth peroxide initiator line 5; cooling jackets (using high pressure water) are mounted around the outer shell of the tube reactor portion; a high pressure separator "HPS"; a high pressure recycle line 6; a low pressure separator "LPS"; a low pressure recycle line 7; a CTA feed line 8; and a carbon monoxide feed line 9.

The reactor further comprises 4 reaction zones demarcated by the location of the peroxide injection points. The first reaction zone feed is attached to the autoclave portion, where 50% of the total reactor feed is introduced. The first reaction zone starts at injection peroxide injection point #1, and ends at peroxide injection point #2. The second reaction zone starts at peroxide injection point #2, where the other 50% of the total feed is injected. The second reaction zone ends at peroxide injection point #3. The third reaction zone starts at peroxide injection point #3, which is located near the start of the tube reactor, and ends at peroxide injection point #4. The forth reaction zone starts at peroxide injection #4 and ends just before the reactor pressure control valve.

For the Inventive Examples, a mixture containing t-butyl peroxy-2 ethylhexanoate (TBPO), tert-butyl peroxypivalate (PIV) and an iso-paraffinic hydrocarbon solvent (boiling range ≥179° C.), was used as the initiator mixture for the first and second injection points. For injection point #3 and #4, a mixture, containing di-t-butyl peroxide (DTBP), and TPO and the iso-paraffinic hydrocarbon solvent, was used. The composition of each mix is given in Table 1.

For the Inventive Examples, a combination of propylene, and methyl ethyl ketone were used as the chain transfer agent (CTA). The CTA mix was injected into the ethylene stream at the suction side of the booster/primary compressor. The composition of the CTA feed to the process was adjusted for the process runs, to adjust the melt index of the product.

Carbon monoxide was used as a comonomer. The carbon monoxide was injected into the ethylene stream at the suction side booster/primary compressor. The reactor process conditions used for manufacture are given in Table 2. Carbon monoxide has an inhibition effect on the peroxides used. For this reason a mix of 3:1, by weight, of PIV to TBPO was used for mixes going to injection points #1 and #2. The higher portion of the lower dissociation peroxide reduces the chances of TPO carryover into the tube portion of the reactor. Also, high temperature targets greater than 240° C. are also avoided to reduce the need for using DTBP which has a higher dissociation temperature which could lead to carry-over into the tube reactor due to CO inhibition. These process conditions reduce the risk of ethylene decomposition while using CO. Process conditions are shown in Table 2.

TABLE 1

Peroxide Compositions for all Inventive Examples (used for Inventive Exs. 1-15)

| | Organic peroxide (PO) | wt % peroxide*** | Weight ratios |
|---|---|---|---|
| Injection Point #1 | PIV ($t_{1/2}$ at 75° C.) $FRl_{auto}$ | 19.5% | $FRm_{auto}/FRl_{auto} = 0.34$ |
| Reaction zone 1 auto | TBPO ($t_{1/2}$ at 91° C.) $FRm_{auto}$ | 6.7% | |
| | DTBP ($t_{1/2}$ at 141° C.) $FRh_{auto}$ | 0.0% | |
| | Solvent** | 73.8% | |
| Injection Point #2 | PIV | 19.2% | $FRm_{auto}/FRl_{auto} = 0.35$ |
| Reaction zone 2 auto | TBPO | 6.7% | |
| | DTBP | 0.0% | |
| | Solvent** | 74.1% | |
| Injection Point #3 | PIV | 0.0% | |
| Reaction zone 3 tube | TBPO | 14.0% | $FRh_{tube}/FRm_{tube} = 0.20$ |
| | DTBP | 2.8% | |
| | Solvent** | 83.2% | |
| Injection Point #4 | PIV | 0.0% | |
| Reaction zone 4 tube | TBPO | 14.6% | $FRh_{tube}/FRm_{tube} = 0.17$ |
| | DTBP | 2.4% | |
| | Solvent | 82.9% | |

*$t_{1/2}$ = one hour half-life (see above test method).
**Solvent = (iso-paraffinic hydrocarbon solvent (boiling range >179° C.)).
***wt % peroxide in peroxide composition

TABLE 2

Process Conditions for Inventive Examples IE1-IE15

| Process Variable | IE1-E5 | IE6-IE15 |
|---|---|---|
| Autoclave | | |
| Pressure (bar) | 2,432 | 2,432 |
| Ethylene Conversion (%) | 26.32 | 27.23 |
| Ethylene (ee) Feed to rnx zone 1 (Mt/hr) | 16.97 | 16.96 |
| Ethylene (ee) Feed to rnx zone 2 (Mt/hr) | 16.96 | 16.95 |
| Top Feed (° C.) | 48.7 | 49.25 |
| Bottom Feed (° C.) | 35.1 | 35.28 |
| Zone 1 Temp (° C.) | 219.9 | 214.8 |
| Zone 2 Temp (° C.) | 230.08 | 230.2 |
| CO Feed to rnx zone 1 | 122.5 | 164 |
| CO feed to rnx zone 2 | 122.5 | 164 |
| weight ratio ee/CO in rnx zone 1 | 138.5 | 103.4 |
| weight ratio ee/CO in rnx zone 2 | 138.5 | 103.4 |
| Tube | | |
| Re-intiation temp (° C.) | 227.9 | 227 |
| Tube Peak 1 Temp (° C.) | 279.9 | 275.2 |
| Re-intiation temp (° C.) | 224.04 | 233.5 |
| Tube Peak 2 Temp (° C.) | 279.8 | 275.9 |

TABLE 2-continued

Process Conditions for Inventive Examples IE1-IE15

| Process Variable | IE1-E5 | IE6-IE15 |
|---|---|---|
| Feed to process | | |
| CO Flow (kg/hr) before split | 245 | 328 |
| Propylene Flow (kg/hr) | 2.76 | 1.87 |
| MEK Flow (kg/hr) | 29.5 | 20.9 |

None or negligible amounts of CO in recycle stream.

Comparative Example 1

For Comparative Example 1 (CE1), a mixture containing t-butyl peroxy-2 ethylhexanoate (TBPO), tert-butyl peroxypivalate (PIV) and an iso-paraffinic hydrocarbon solvent (boiling range ≥179° C.), was used as the initiator mixture for the first and second injection points. For injection point #3 and #4, a mixture, containing di-t-butyl peroxide (DTBP), and TPO and the iso-paraffinic hydrocarbon solvent, was used. Table 3 shows the flows of the peroxide initiator and solvent solution used.

TABLE 3

Peroxide Initiator Flows in "liters per hour" at Each Injection Point

| Organic peroxide (PO) | | Comparative Example 1 |
|---|---|---|
| | Material | lt/hr |
| Injection Point #1 auto | PIV | 4.1 |
| | TPO | 1.4 |
| | DTBP | 0.0 |
| | Solvent | 15.5 |
| | Total | 21.0 |
| Injection Point #2 auto | PIV | 4.9 |
| | TPO | 1.7 |
| | DTBP | 0.0 |
| | Solvent | 18.9 |
| | Total | 25.5 |
| Injection Point #3 tube | PIV | 0 |
| | TPO | 3.0 |
| | DTBP | 0.6 |
| | Solvent | 17.8 |
| | Total | 21.4 |
| Injection Point #4 tube | PIV | 0.00 |
| | TPO | 0.06 |
| | DTBP | 0.01 |
| | Solvent | 0.34 |
| | Total | 0.41 |

For Comparative Example 1, a combination of propylene, and methyl ethyl ketone were used as the chain transfer agent (CTA). The CTA mix was injected into the ethylene stream at the suction side of the booster/primary compressor. For Comparative Example 1, carbon monoxide was used as a comonomer. The carbon monoxide was injected into the ethylene stream at the suction side booster/primary compressor. The reactor process conditions used to manufacture Comparative Example 1 are given in Table 4.

Properties of Examples and Comparative Examples are listed in Tables 5-11. Comparative Example 2 (CE2) is Dow LDPE 50041 (4.15 melt index, 0.924 g/cc), available from The Dow Chemical Company.

TABLE 4

Process Conditions

| Process Variable | Comparative Example 1 |
|---|---|
| Pressure (bar) | 2,423 |
| Ethylene Conversion (%) | 25.7 |
| Ethylene Feed 1 (Mt/hr) | 17.07 |
| Ethylene Feed 2 (Mt/hr) | 17.05 |
| Top Feed (° C.) | 47 |
| Bottom Feed (° C.) | 35 |
| Zone 1 Temp (° C.) | 220 |
| Zone 2 Temp (° C.) | 230 |
| Re-intiation temp (° C.) | 229 |
| Tube Peak 1 Temp (° C.) | 282 |
| Re-intiation temp (° C.) | 216 |
| Tube Peak 2 Temp (° C.) | 285 |
| CO Flow (Kg/hr) | 160 |
| Propylene Flow (kg/hr) | 141 |
| MEK Flow (kg/hr) | 0.26 |

Property Features of Inventive and Comparative Polymers (IE1-IE15, CE1, CE2)

Figure 2:
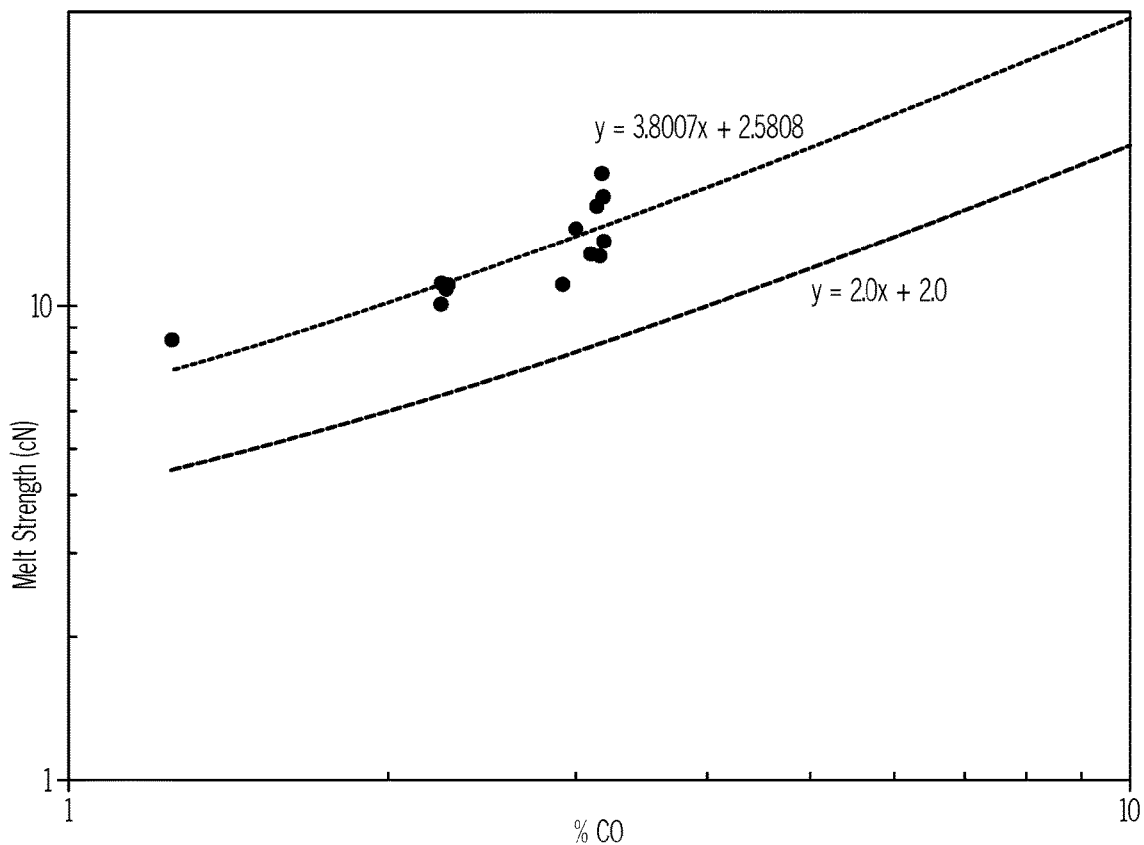
FIG. 2 depicts the logarithmic scale plot of the melt strength vs % CO level of the Inventive Examples.
Figure 3:
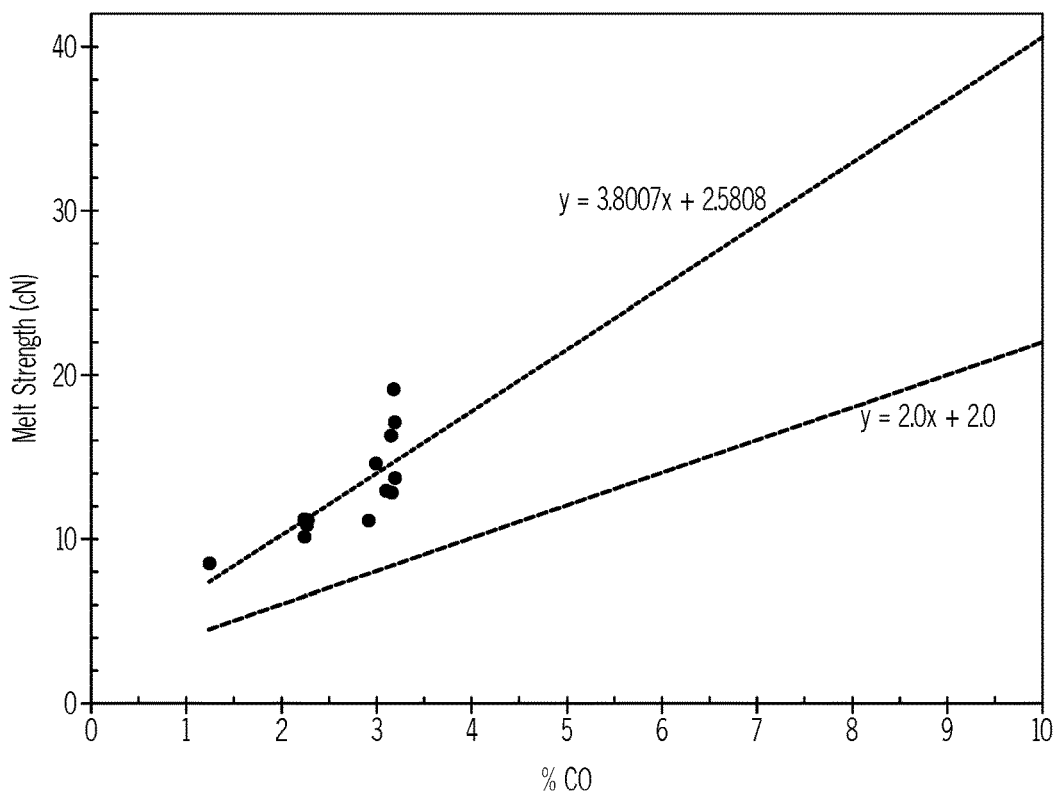
FIG. 3 depicts the linear scale plot of the melt strength vs % CO level of the Inventive Examples.

Table 5 contains the melt index (I2), density, melt strength, and velocity at break of the melt strength data. The melt index of IE1-IE15 are in a suitable range for their use in extrusion coating or cast film applications. The densities of IE1-15 are high (0.935-0.941 g/cc), in part, due to the incorporation of carbon monoxide (CO). The melt strength of these samples is unexpectedly high, especially as the CO level is raised in the samples as shown in FIG. 2 and FIG. 3. The inventive examples are useful in applications, such as extrusion coating, especially due to their broader molecular weight distribution (cc-GPC Mw/Mn in Table 6). Table 7 contains the TDGPC-related properties derived from the LS and viscosity detectors, in conjunction with the concentration detector. Table 8 contains the DMS viscosity data, as summarized by the following: the viscosities measured at 0.1, 1, 10, and 100 rad/s; the viscosity ratio or the ratio of the viscosity measured at 0.1 rad/s to the viscosity measured at 100 rad/s, each measured at 190° C.; and the tan delta measured at 0.1 rad/s and 190° C.

Table 9 contains the CO (carbon monoxide) content, and the branches per 1000C as measured by $^{13}C$ NMR. These polymers contain amyl, or C5 branches, which are not contained in substantially linear polyethylenes, such as AFFINITY Polyolefin Plastomers, or LLDPE, such as DOWLEX Polyethylene Resins, both produced by The Dow Chemical Company. IE1-IE15 and Comparative Example 1-2 contained greater than, or equal to, 0.5 amyl groups (branches) per 1000 carbon atoms (the inventive examples contain greater than 1.0 amyl groups (branches) per 1000 carbon atoms). The inventive examples also contain CO at a level of from 2 to 4 mol % CO, or from 2 to 4 wt % CO. Table 10 lists branching results from 1H NMR.

Figure 4:
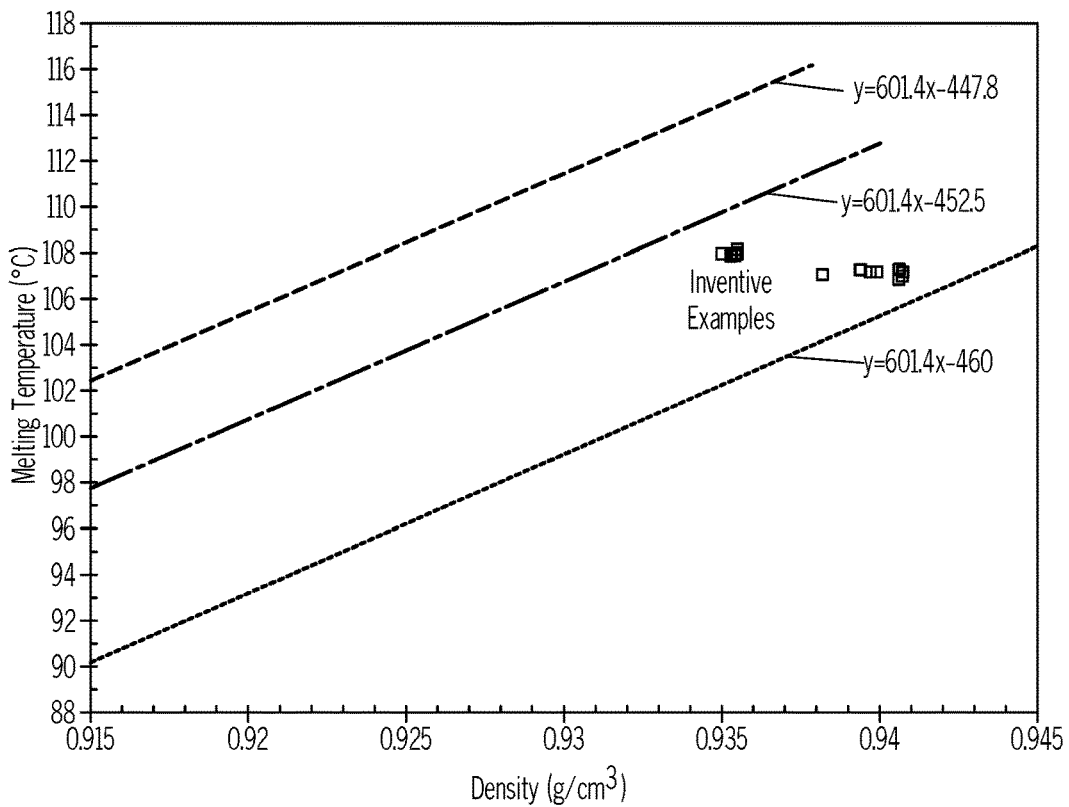
FIG. 4 depicts the melting temperature vs. the density of the Inventive Examples.

Table 11 contains the DSC results, including melting point (Tm), the heat of fusion, the percent crystallinity, and the crystallization point. The melting point for the inventive examples are relatively low for their high densities, as shown in FIG. 4.

TABLE 5

Melt Index (I2), Density, Melt Strength (MS) and Melt Strength Velocity at Break at 190° C.

| Sample | I2 (190° C.) | Density (g/cc) | Melt Strength (cN) | Velocity at break (mm/s) |
|---|---|---|---|---|
| IE1 | 5.2 | 0.9353 | 11.1 | 258 |
| IE2 | 5.0 | 0.9353 | 11.2 | 326 |

TABLE 5-continued

Melt Index (I2), Density, Melt Strength (MS) and Melt Strength Velocity at Break at 190° C.

| Sample | I2 (190° C.) | Density (g/cc) | Melt Strength (cN) | Velocity at break (mm/s) |
|---|---|---|---|---|
| IE3 | 5.4 | 0.9354 | 10.8 | 310 |
| IE4 | 5.0 | 0.9350 | 11.1 | 297 |
| IE5 | 5.2 | 0.9355 | 11.0 | 288 |
| IE6 | 5.3 | 0.9397 | 12.9 | 275 |
| IE7 | 4.5 | 0.9407 | 13.7 | 251 |
| IE8 | 3.8 | 0.9406 | 19.1 | 127 |
| IE9 | 4.3 | 0.9407 | 12.8 | 274 |
| IE10 | 4.1 | 0.9382 | 11.1 | 298 |
| IE11 | 4.1 | 0.9407 | 16.3 | 201 |
| IE12 | 3.9 | 0.9406 | 17.1 | 251 |
| IE13 | 4.4 | 0.9399 | 12.8 | 246 |
| IE14 | 4.2 | 0.9394 | 14.6 | 270 |
| IE15 | 5.4 | 0.9355 | 10.1 | 313 |
| CE1 | 5.7 | 0.9260 | 8.6 | 363 |
| CE2 | 4.0 | 0.9245 | 7.7 | 335 |

IE1-IE5: Different sample points from the same polymerization run.
IE6-IE15: Different sample points from the same polymerization run.
CE1: Separate polymerization.
CE2: commercial product LDPE 5004I.

TABLE 6

TDGPC-related properties (conventional calibration).

| Sample | cc-GPC Mn (g/mol) | cc-GPC Mw (g/mol) | cc-GPC Mz (g/mol) | cc-GPC Mw/Mn |
|---|---|---|---|---|
| IE1 | 13,748 | 149,875 | 593,902 | 10.90 |
| IE2 | 13,759 | 150,094 | 594,816 | 10.91 |
| IE3 | 13,770 | 151,386 | 607,564 | 10.99 |
| IE4 | 13,825 | 151,677 | 595,998 | 10.97 |
| IE5 | 13,644 | 150,829 | 599,446 | 11.05 |
| IE6 | 13,936 | 162,061 | 643,685 | 11.63 |
| IE7 | 14,077 | 165,499 | 658,173 | 11.76 |
| IE8 | 14,438 | 171,988 | 679,410 | 11.91 |
| IE9 | 14,428 | 166,546 | 654,692 | 11.54 |
| IE10 | 14,533 | 165,891 | 655,459 | 11.42 |
| IE11 | 14,571 | 170,655 | 674,800 | 11.71 |
| IE12 | 14,698 | 175,700 | 690,842 | 11.95 |
| IE13 | 14,065 | 165,207 | 652,157 | 11.75 |
| IE14 | 14,325 | 165,959 | 658,374 | 11.58 |
| IE15 | 13,579 | 149,542 | 600,578 | 11.01 |
| CE1 | 14,468 | 134,234 | 508,683 | 9.28 |
| CE2 | 10,728 | 78,398 | 308,641 | 7.31 |

TABLE 7

TDGPC-related properties (derived from LS and viscosity detectors in conjunction with the concentration detector).

| Sample | Mw-abs (g/mol) | Mz-abs (g/mol) | Mz-abs/Mw-abs | Mw (LS-abs)/Mw (cc-GPC) | IVw (dl/g) | gpcBR | IVcc (dl/g) |
|---|---|---|---|---|---|---|---|
| IE1 | 369,054 | 2,976,875 | 8.07 | 2.46 | 1.06 | 2.75 | 2.06 |
| IE2 | 367,291 | 2,852,662 | 7.77 | 2.45 | 1.06 | 2.75 | 2.06 |
| IE3 | 367,579 | 2,921,488 | 7.95 | 2.43 | 1.06 | 2.70 | 2.07 |
| IE4 | 371,516 | 2,817,797 | 7.58 | 2.45 | 1.06 | 2.78 | 2.08 |
| IE5 | 370,552 | 2,881,740 | 7.78 | 2.46 | 1.06 | 2.76 | 2.07 |
| IE6 | 413,172 | 3,214,754 | 7.78 | 2.55 | 1.11 | 2.85 | 2.17 |
| IE7 | 420,135 | 3,228,908 | 7.69 | 2.54 | 1.13 | 2.85 | 2.21 |
| IE8 | 444,721 | 3,418,352 | 7.69 | 2.59 | 1.16 | 2.93 | 2.27 |
| IE9 | 427,392 | 3,284,109 | 7.68 | 2.57 | 1.13 | 2.90 | 2.22 |
| IE10 | 426,004 | 3,308,819 | 7.77 | 2.57 | 1.13 | 2.89 | 2.21 |
| IE11 | 438,894 | 3,433,656 | 7.82 | 2.57 | 1.15 | 2.89 | 2.26 |
| IE12 | 456,000 | 3,465,258 | 7.60 | 2.60 | 1.17 | 2.95 | 2.31 |
| IE13 | 424,613 | 3,289,667 | 7.75 | 2.57 | 1.13 | 2.87 | 2.21 |
| IE14 | 430,937 | 3,241,360 | 7.52 | 2.60 | 1.14 | 2.90 | 2.21 |
| IE15 | 366,495 | 2,722,697 | 7.43 | 2.45 | 1.06 | 2.71 | 2.05 |
| CE1 | 297,184 | 1,934,313 | 6.51 | 2.21 | 0.99 | 2.43 | 1.91 |
| CE2 | 272,270 | 1,753,770 | 6.44 | 2.32 | 0.915 | 2.53 | 1.62 |

TABLE 8

Viscosities in Pa · s, Viscosity Ratio, and Tan Delta, all at 190° C.

| Sample | Visc. 0.1 rad/s | Visc. 1 rad/s | Visc. 10 rad/s | Visc. 100 rad/s | Vis. Ratio V0.1/V100 | Tan Delta 0.1 rad/s |
|---|---|---|---|---|---|---|
| IE1 | 2,992 | 1,889 | 839 | 287 | 10.41 | 4.49 |
| IE2 | 2,959 | 1,870 | 831 | 284 | 10.42 | 4.69 |
| IE3 | 2,950 | 1,871 | 828 | 283 | 10.41 | 4.61 |
| IE4 | 3,067 | 1,936 | 853 | 291 | 10.56 | 4.69 |
| IE5 | 2,990 | 1,897 | 843 | 288 | 10.37 | 4.76 |
| IE6 | 3,123 | 1,909 | 834 | 285 | 10.97 | 3.87 |
| IE7 | 3,167 | 1,935 | 839 | 285 | 11.12 | 3.97 |
| IE8 | 3,990 | 2,289 | 942 | 308 | 12.94 | 3.40 |
| IE9 | 3,525 | 2,070 | 879 | 294 | 11.99 | 3.43 |
| IE10 | 3,866 | 2,265 | 947 | 312 | 12.38 | 3.76 |
| IE11 | 3,987 | 2,279 | 952 | 313 | 12.73 | 3.47 |
| IE12 | 3,934 | 2,241 | 923 | 302 | 13.00 | 3.44 |
| IE13 | 3,257 | 1,933 | 829 | 280 | 11.65 | 3.57 |
| IE14 | 3,758 | 2,191 | 925 | 307 | 12.25 | 3.54 |
| IE15 | 2,751 | 1,801 | 808 | 279 | 9.85 | 5.34 |
| CE1 | 2,901 | 1,856 | 817 | 278 | 10.43 | 4.54 |
| CE2 | 3,932 | 2,404 | 1,034 | 344 | 11.44 | 4.50 |

TABLE 9

Branching Results by $^{13}$C NMR

| Sample | C1 (/1000C) | 1,3 diethyl branches (/1000C) | C2 on Quat Carbon (/1000C) | C4 (/1000C) | C5 (/1000C) | C6+ (/1000C) | Mol % or Wt % CO*** |
|---|---|---|---|---|---|---|---|
| IE1 | ND | 2.83 | 1.04 | 5.41 | 1.73 | 3.41 | 2.28 |
| IE2 | ND | 2.78 | 1.26 | 5.30 | 1.89 | 3.62 | 2.24 |
| IE3 | ND | 2.94 | 1.12 | 5.34 | 1.61 | 3.31 | 2.27 |
| IE4 | ND | 2.81 | 0.91 | 5.55 | 1.35 | 3.18 | 2.24 |
| IE5 | ND | 3.11 | 1.43 | 5.63 | 1.38 | 3.28 | 2.27 |
| IE6 | ND | 3.19 | 1.27 | 5.20 | 1.35 | 3.20 | 3.11 |
| IE7 | ND | 2.42 | 0.98 | 5.18 | 1.34 | 3.24 | 3.19 |
| IE8 | ND | 2.87 | 1.29 | 5.05 | 1.39 | 3.23 | 3.18 |
| IE9 | ND | 3.06 | 1.33 | 5.19 | 1.30 | 3.22 | 3.15 |
| IE10 | 0.4 ± 0.2 | 2.65 | 1.04 | 5.05 | 1.59 | 3.34 | 2.92 |
| IE11 | ND | 2.68 | 1.30 | 5.04 | 1.44 | 3.39 | 3.15 |
| IE12 | ND | 2.86 | 1.10 | 5.10 | 1.57 | 3.24 | 3.19 |
| IE13 | ND | 2.89 | 1.36 | 5.13 | 1.24 | 3.19 | 3.17 |
| IE14 | 0.2 ± 0.1 | 2.90 | 1.44 | 5.04 | 1.35 | 3.31 | 3.00 |

TABLE 9-continued

Branching Results by $^{13}$C NMR

| Sample | C1 (/1000C) | 1,3 diethyl branches (/1000C) | C2 on Quat Carbon (/1000C) | C4 (/1000C) | C5 (/1000C) | C6+ (/1000C) | Mol % or Wt % CO*** |
|---|---|---|---|---|---|---|---|
| IE15 | ND | 2.91 | 1.24 | 5.43 | 1.72 | 3.43 | 2.24 |
| CE1 | 3.81 | 3.48 | 1.16 | 5.57 | 1.43 | 3.3 | 1.25 |
| CE2 | ND | 3.67 | 1.51 | 6.23 | 1.77 | 2.8 | ND |

**ND = not detected.
***Based on the weight of the polymer

TABLE 10

Branching Results by $^1$H NMR

| Sample | Vinyl/ 1000 C | Cis and Trans Vinylenes/ 1000 C | Tri-substituted/ 1000 C | Vinylidenes/ 1000 C | Total Unsaturation/ 1000 C |
|---|---|---|---|---|---|
| IE2  | 0.071 | 0.036 | 0.078 | 0.125 | 0.31 |
| IE4  | 0.072 | 0.047 | 0.082 | 0.128 | 0.33 |
| IE6  | 0.088 | 0.045 | 0.082 | 0.118 | 0.33 |
| IE9  | 0.083 | 0.044 | 0.076 | 0.118 | 0.32 |
| IE10 | 0.103 | 0.043 | 0.088 | 0.123 | 0.36 |
| IE11 | 0.083 | 0.042 | 0.08  | 0.12  | 0.33 |
| IE13 | 0.089 | 0.046 | 0.088 | 0.122 | 0.34 |
| IE15 | 0.072 | 0.047 | 0.082 | 0.122 | 0.32 |

TABLE 11

DSC Results

| Sample | Tm (° C.) | Heat of Fusion (J/g) | % Crystallinity | Tc (° C.) |
|---|---|---|---|---|
| IE1  | 108.0 | 148.4 | 50.8 | 95.2 |
| IE2  | 107.9 | 147.3 | 50.4 | 95.7 |
| IE3  | 107.9 | 147.9 | 50.7 | 95.0 |
| IE4  | 108.0 | 148.2 | 50.8 | 95.4 |
| IE5  | 108.0 | 146.6 | 50.2 | 95.1 |
| IE6  | 107.2 | 145.2 | 49.7 | 94.6 |
| IE7  | 107.2 | 144.4 | 49.5 | 94.6 |
| IE8  | 106.9 | 145.2 | 49.7 | 95.0 |
| IE9  | 107.0 | 145.3 | 49.8 | 94.9 |
| IE10 | 107.1 | 146.4 | 50.1 | 95.0 |
| IE11 | 107.2 | 147.4 | 50.5 | 95.1 |
| IE12 | 107.3 | 147.9 | 50.7 | 95.1 |
| IE13 | 107.2 | 146.9 | 50.3 | 94.6 |
| IE14 | 107.3 | 146.7 | 50.2 | 95.2 |
| IE15 | 108.2 | 144.6 | 49.5 | 94.7 |
| CE1  | 105.4 | 136.5 | 46.7 | 93.2 |
| CE2  | 110.6 | 157.3 | 53.9 | 100.1 |

Extrusion Coating

The Inventive (IE) and Comparative Examples (CE) shown in Table 12 were extrusion coated using a Black-Clawson Extrusion Coating Line. The line consists of a 3.5 inch, 30:1 Length/Diameter, 4:1 compression ratio single flight screw with two spiral Mattock mixing sections near the end of the screw. Resin evaluations utilized an extrusion speed of 90 RPM, resulting in ~250 lb/hr output. Line speeds were run at 440 ft/min, resulting in an approximate 1 mil coating onto a "50 lb/ream brown Kraft paper."

Test specimens were cut in "24 inch by 36 inch" dimensions. For each test specimen, two "X cuts," approximately 2 inches on each line of the X," were made in the cross direction of the sample. Each "X cut" was made approximately 6 inches from an edge of the polymer coating in each test specimen. The "X cut" penetrated only the polymer coating. The polymer in one portion of the "X cut" was partially separated from the paper using an utility knife. The released polymer was hand grabbed by an operator, and the test specimen was held down with the other hand of the operator. The polymer was slowly pulled from the paper for a distance of approximately 1 to 2 inches. The slow pull takes approximately 5 to 10 seconds. A "Pass" value was recorded when the adhesion between the polymer layer and the paper surface was stronger than the inter-fiber matrix adhesion of the paper itself (or greater than, or equal to, 5% of the paper surface tore off with the polymer). A "Fail" value was recorded when the polymer layer was pulled from the paper surface, with little or no paper fibers (or less than 5% of the paper surface tore off with the polymer). The percentage of the paper surface that tore off with the polymer was determined by visual inspection of the total area of the polymer coating that was removed from the paper substrate. For each polymer, one test specimen was examined, and two "X cuts" were made in each test specimen.

TABLE 12

Fiber Tear Adhesion Results (two "X cuts" per sample)

| Example | 580° F. | 590° F. | 600° F. | 610° F. | 620° F. |
|---|---|---|---|---|---|
| CE2  |      | FAIL | FAIL | FAIL | PASS |
| IE4  |      | FAIL | PASS | PASS | PASS |
| IE9  |      | FAIL | PASS | PASS | PASS |
| IE10 | DD*  | PASS | PASS | PASS | PASS |
| IE11 | DD*  | PASS | PASS | PASS | PASS |
| IE13 | DD*  | PASS | PASS | PASS | PASS |
| CE1  | DD*  | FAIL | FAIL | PASS | PASS |
| CE2  |      | FAIL | FAIL | FAIL | PASS |
| IE2  | FAIL | FAIL | FAIL | PASS | PASS |
| IE6  | FAIL | FAIL | FAIL | PASS | PASS |
| IE15 | FAIL | FAIL | FAIL | PASS | PASS |

*DD-Melt curtain tore from die - unable to obtain a sample for fiber tear adhesion test.

Table 12 shows the results from the Kraft paper fiber tear adhesion testing. The Inventive Examples were shown to "Pass" at temperatures from 590° F. to 620° F. in some cases. Comparative Example 2 was shown to "Fail" at temperatures from 590° F. to 610° F. Thus, the adhesion of the Inventive Examples are preferred, as compared to that of Comparative Example 2. The inventive examples can also be extrusion coated at high speeds and high temperatures.

The invention claimed is:

1. A composition comprising an ethylene/CO interpolymer, formed from a high pressure, free-radical polymerization, and wherein the ethylene/CO interpolymer has the following properties:
   a) a CO content from "greater than 0" weight percent to less than, or equal to, 10 weight percent CO (carbon monoxide), based on the weight of the interpolymer; and b) a melting point, Tm, in ° C. that meets the following relationship:

Tm(° C.)≤601.4*(Density in g/cc)−452.5(° C.); and wherein the ethylene/CO interpolymer meets the following relationship: MS (cN) ≥2.0 (wt % C0)+2.0.

2. The composition of claim 1, wherein the ethylene/CO interpolymer has a melt index (I2) from 0.1 to 100 g/10 min.

3. The composition of claim 1, wherein the ethylene/CO interpolymer has a Tm (° C.) ≥601.4*(Density in g/cc)−460.0(° C.).

4. The composition of claim 1, wherein the ethylene/CO interpolymer has a melting temperature, Tm, from 105.5° C. to 110.5° C.

5. The composition of claim 1, wherein the ethylene/CO interpolymer has a density from 0.910 to 0.990 g/cc.

6. The composition of claim 1, wherein the ethylene/CO interpolymer has an amyl group level greater than, or equal to, 0.5 amyl group per 1000 carbon atoms, as determined by 13C NMR.

7. The composition of claim 1, wherein ethylene/CO interpolymer is an ethylene/CO copolymer.

8. The composition of claim 1, wherein the composition further comprises a second ethylene-based polymer.

9. The composition of claim 8, wherein the second ethylene-based polymer is selected from a LDPE, an ethylene/alpha-olefin copolymer, or a combination thereof.

10. An article comprising at least one component formed from the composition of claim 1.

11. The article of claim 10, wherein the article is a coated substrate or a film.

12. The article of claim 10, wherein the article is a coating, which is produced by extrusion coating or extrusion lamination.

13. A process to form a composition, said composition comprising an ethylene/CO interpolymer, formed from a high pressure, free-radical polymerization, and wherein the ethylene/CO interpolymer has the following properties:

a) a CO content from "greater than 0" weight percent to less than, or equal to, 10 weight percent CO (carbon monoxide), based on the weight of the interpolymer; and b) a melting point, Tm, in ° C. that meets the following relationship:

Tm(° C.)≤601.4*(Density in g/cc)−452.5(° C.);

said process comprising polymerizing ethylene and CO, using a high pressure, free-radical polymerization process, to form the ethylene/CO interpolymer, and wherein the polymerization takes place in a reactor configuration comprising at least one autoclave reactor comprising ≥2 reaction zones, and at least one tubular reactor comprising ≥2 reaction zones, and wherein in the autoclave reactor, the polymerizations takes place in the presence of at least one "medium temperature free-radical initiator" denoted $FRm_{auto}$, and at least one "low temperature free-radical initiator" denoted $FRl_{auto}$, and wherein the weight ratio ($ratio_{auto}$) of the $FRm_{auto}$ to $FRl_{auto}$ is from 0.04 to 1.00 for each reaction zone in the autoclave reactor; and wherein in the tubular reactor, the polymerizations takes place in the presence of at least one "high temperature free-radical initiator" denoted $FRh_{tube}$, and at least one "medium temperature free-radical initiator" denoted $FRm_{tube}$, and wherein the weight ratio ($ratio_{tube}$) of the $FRh_{tube}$ to $FRm_{tube}$ is from 0.06 to 0.50 for each reaction zone in the tubular reactor.

14. The process of claim 13, wherein the polymerization temperature in each reaction zone of the autoclave reactor is, independently, from 190° C. to 270° C.

15. The process of claim 13, wherein, for the autoclave reactor, the weight ratio of "the amount of ethylene added to a reaction zone" to "the amount of CO added to the same reaction zone" is from 388 to 39.

16. The process of claim 13, wherein the polymerization temperature of each reaction zone of the autoclave reactor is, independently, <250° C.

17. The process of claim 13, wherein the polymerization temperature of each reaction zone of the tubular reactor is, independently, from 260° C. to 300° C.

18. The process of claim 13, wherein ethylene/CO interpolymer is an ethylene/CO copolymer.

* * * * *